US012300886B2

(12) United States Patent
Dallal et al.

(10) Patent No.: US 12,300,886 B2
(45) Date of Patent: May 13, 2025

(54) RADIO FREQUENCY BEAMFORMING DEVICE WITH CYLINDRICAL LENSES

(71) Applicant: QUALCOMM Incorporated, San Diego, CA (US)

(72) Inventors: Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 17/885,304

(22) Filed: Aug. 10, 2022

(65) Prior Publication Data

US 2024/0055771 A1 Feb. 15, 2024

(51) Int. Cl.

| | |
|---|---|
| ***H01Q 25/00*** | (2006.01) |
| ***H01Q 1/24*** | (2006.01) |
| ***H01Q 15/02*** | (2006.01) |
| ***H01Q 21/28*** | (2006.01) |

(52) U.S. Cl.

CPC ............. *H01Q 15/02* (2013.01); *H01Q 1/242* (2013.01); *H01Q 21/28* (2013.01)

(58) Field of Classification Search

CPC .......... H01Q 15/04; H01Q 3/36; H01Q 21/10; H01Q 21/061; H01Q 21/08; H01Q 1/243; H01Q 25/008; H01Q 19/062

See application file for complete search history.

(56) References Cited

U.S. PATENT DOCUMENTS 11,056,166 B2 7/2021 Xie et al.
11,056,766 B2 7/2021 Takahashi et al.
2014/0077995 A1* 3/2014 Artemenko .............. H01Q 3/24 343/754
2017/0062944 A1* 3/2017 Zimmerman .......... H01Q 15/08
2019/0103660 A1 4/2019 Zimmerman et al.
2019/0237874 A1* 8/2019 Michaelis .............. H01Q 1/246
2022/0216617 A1* 7/2022 Kasani .................. H01Q 19/10
2022/0247067 A1 8/2022 Chen et al.
2023/0361476 A1 11/2023 Dallal et al.

FOREIGN PATENT DOCUMENTS

FR 2839206 B1 6/2006

OTHER PUBLICATIONS

International Search Report and Written Opinion—PCT/US2023/069895—ISA/EPO—Oct. 27, 2023.

* cited by examiner

*Primary Examiner* — Awat M Salih
(74) *Attorney, Agent, or Firm* — Polsinelli LLP

(57) ABSTRACT

Systems and techniques are provided for radio frequency (RF) beamforming using a plurality of differently skewed cylindrical lenses. In one example, an apparatus for wireless communication may include a plurality of cylindrical lenses, each respective cylindrical lens of the plurality of cylindrical lenses having a respective first surface and a respective second surface opposite to the respective first surface. Each respective cylindrical lens can include a power direction corresponding to a curvature of each respective first surface and a non-power direction that is orthogonal to the power direction. The apparatus can further include at least one linear antenna array disposed proximate to each respective second surface of each respective cylindrical lens, the at least one linear antenna array including a plurality of antenna array elements.

30 Claims, 15 Drawing Sheets

RADIO FREQUENCY BEAMFORMING DEVICE WITH CYLINDRICAL LENSES

FIELD

The present disclosure generally relates to wireless communications. For example, aspects of the present disclosure relate to radio frequency (RF) beamforming devices with cylindrical lenses.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In some cases, wireless communications can be performed using high frequency ranges (e.g., sub-terahertz spectrum, terahertz spectrum, etc.). In some examples, devices that communicate using such high frequencies can require additional antennas to avoid degraded performance due to path loss that results from the shorter wavelengths. However, configuring additional antennas in a wireless device can result in increased hardware and/or software complexity, increased power consumption, and increased cost.

In some examples, systems and techniques described herein provide for radio frequency (RF) beamforming. In some aspects, a beamforming device can be implemented that includes a plurality of lenses (e.g., cylindrical lens) and multiple phased antenna arrays. According to at least one illustrative example, a wireless communication apparatus is provided. The wireless communication apparatus includes: a plurality of cylindrical lenses, each respective cylindrical lens of the plurality of cylindrical lenses having a respective first surface and a respective second surface opposite to the respective first surface, wherein each respective cylindrical lens includes a power direction corresponding to a curvature of each respective first surface and a non-power direction that is orthogonal to the power direction; and at least one linear antenna array disposed proximate to each respective second surface of each respective cylindrical lens, the at least one linear antenna array including a plurality of antenna array elements.

In another example, a method for wireless communications is provided. The method includes: steering a first radio frequency (RF) beam in a first direction using a first linear antenna array from a plurality of linear antenna arrays, wherein the first linear antenna array is disposed proximate to a first surface of a first cylindrical lens having a curved second surface opposite to the first surface of the first cylindrical lens, and wherein the plurality of linear antenna arrays is arranged in a parallel configuration; and steering a second RF beam in a second direction using a second linear antenna array from the plurality of linear antenna arrays, wherein the second linear antenna array is disposed proximate to a first surface of a second cylindrical lens having a curved second surface opposite to the first surface of the second cylindrical lens.

In another example, an apparatus for wireless communication is provided that includes at least one memory comprising instructions and at least one processor (e.g., implemented in circuitry) configured to execute the instructions and cause the apparatus to: steer a first radio frequency (RF) beam in a first direction using a first linear antenna array from a plurality of linear antenna arrays, wherein the first linear antenna array is disposed proximate to a first surface of a first cylindrical lens having a curved second surface opposite to the first surface of the first cylindrical lens, and wherein the plurality of linear antenna arrays is arranged in a parallel configuration; and steer a second RF beam in a second direction using a second linear antenna array from the plurality of linear antenna arrays, wherein the second linear antenna array is disposed proximate to a first surface of a second cylindrical lens having a curved second surface opposite to the first surface of the second cylindrical lens.

In another example, a non-transitory computer-readable medium is provided for performing wireless communications, which has stored thereon instructions that, when executed by one or more processors, cause the one or more processors to: steer a first radio frequency (RF) beam in a first direction using a first linear antenna array from a plurality of linear antenna arrays, wherein the first linear antenna array is disposed proximate to a first surface of a first cylindrical lens having a curved second surface opposite to the first surface of the first cylindrical lens, and wherein the plurality of linear antenna arrays is arranged in a parallel configuration; and steer a second RF beam in a second direction using a second linear antenna array from the plurality of linear antenna arrays, wherein the second linear antenna array is disposed proximate to a first surface of a second cylindrical lens having a curved second surface opposite to the first surface of the second cylindrical lens.

In another example, an apparatus for wireless communications is provided. The apparatus includes: means for steering a first radio frequency (RF) beam in a first direction using a first linear antenna array from a plurality of linear antenna arrays, wherein the first linear antenna array is disposed proximate to a first surface of a first cylindrical lens having a curved second surface opposite to the first surface of the first cylindrical lens, and wherein the plurality of linear antenna arrays is arranged in a parallel configuration; and means for steering a second RF beam in a second direction using a second linear antenna array from the plurality of linear antenna arrays, wherein the second linear antenna array is disposed proximate to a first surface of a second cylindrical lens having a curved second surface opposite to the first surface of the second cylindrical lens.

In some aspects, the one or more apparatuses described above is or is part of a user equipment (UE) or a network entity. The network entity may include a base station (e.g., a 3GPP gNodeB (gNB) for 5G/NR, a 3GPP eNodeB (eNB) for LTE, a Wi-Fi access point (AP), or other base station) or a portion of a base station having a disaggregated architecture (e.g., a central unit (CU), a distributed unit (DU), a radio unit (RU), a Near-Real Time (Near-RT) RAN Intelligent Controller (RIC), or a Non-Real Time (Non-RT) RIC of a gNB or other base station). In some aspects, an apparatus includes a transceiver or multiple transceivers configured to transmit and/or receive radio frequency (RF) signals. In some aspects, the at least one processor includes one or more neural processing units (NPUs), one or more central processing units (CPUs), one or more graphics processing units (GPUs), any combination thereof, and/or other processing device(s) or component(s).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
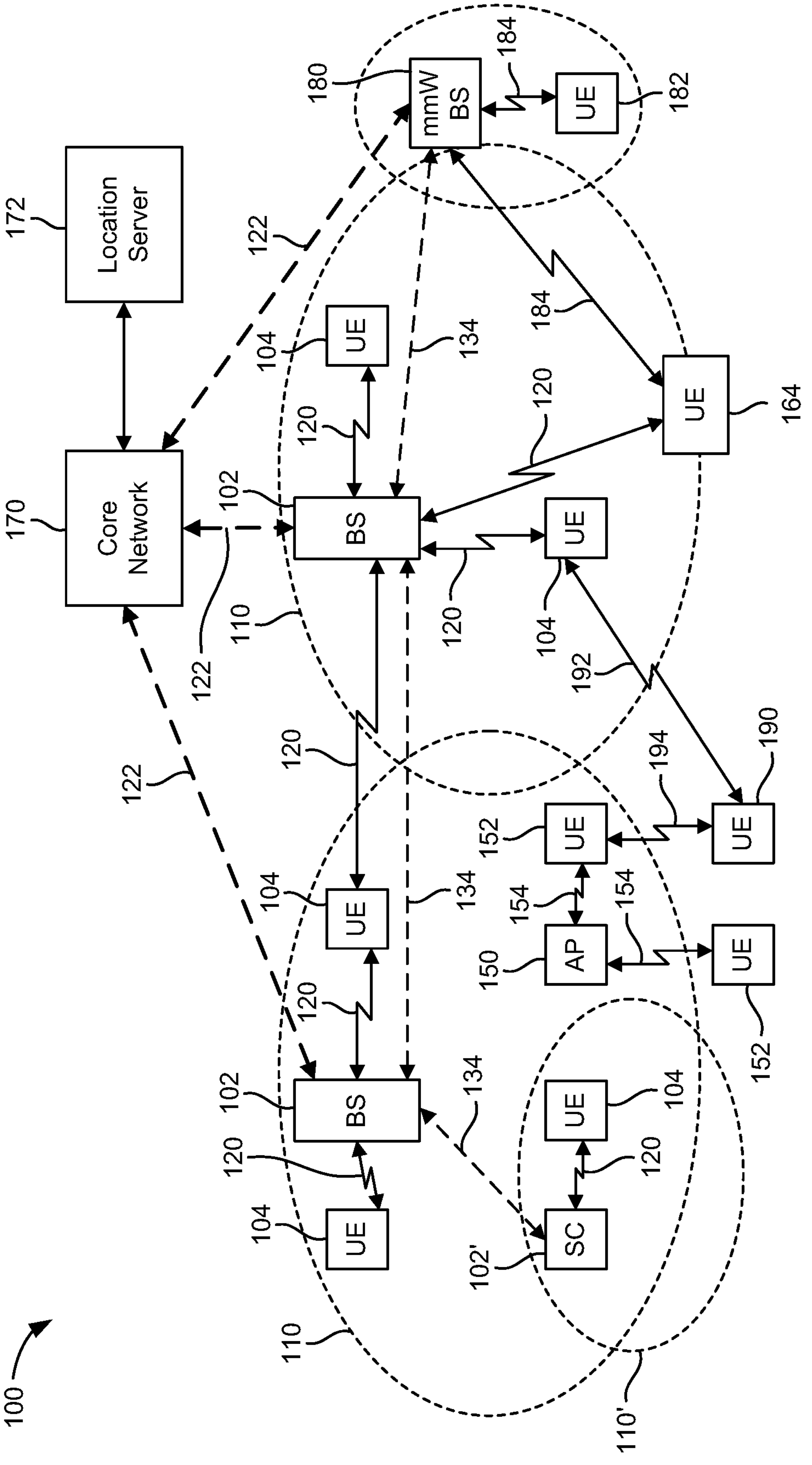
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit (CU), a distributed unit (DU), a radio unit (RU), etc.). In one example, an access link between a UE and a 3GPP gNB can be over a Uu interface. In some cases, an access link may support uplink signaling, downlink signaling, connection procedures, etc.

In some examples, a gNB and UE may be configured to operate using a higher frequency range. For instance, the sub-terahertz frequency spectrum can range between 90 gigahertz (GHz) and 300 GHz. In such a frequency range, the wavelength can be as small as 1 millimeter (mm). Consequently, operation using higher frequencies may result in degraded performance due to higher path loss. In some cases, additional antennas or antenna arrays may be added to a device (e.g., a UE) to improve performance at higher frequencies. For example, the number of antenna elements can be increased in proportion with the square of the frequency. However, increasing the number of antenna elements can be undesirable due to factors such as added cost, increased complexity, and a larger footprint (e.g., consumes more space on a printed circuit board and/or within a device).

Systems, apparatuses, processes (also referred to as methods), and computer-readable media (collectively referred to as "systems and techniques") are described herein for radio frequency (RF) beamforming. In some aspects, a beamforming device can be implemented that includes a plurality of lenses (e.g., cylindrical lenses) and multiple phased antenna arrays. In one illustrative example, the plurality of lenses can include at least one skewed cylindrical lens and one or more differently skewed cylindrical lenses. The one or more differently skewed cylindrical lens can have a different skew than the at least one skewed cylindrical lens. In some examples, each respective cylindrical lens of the plurality of cylindrical lenses can have a different skew. For example, each respective cylindrical lens of the plurality of lenses can have a curved surface with a different curvature. In one illustrative example, the plurality of lenses can include at least one non-skewed cylindrical lens and one or more skewed cylindrical lens. In some aspects, the skewed and differently skewed cylindrical lenses can each be associated with a different beam forming angle. In some aspects, each lens of the plurality of lenses can be associated with at least one phased antenna array. In some examples, each lens of the plurality of lenses can be associated with at least one linear antenna array including a plurality of antenna array elements.

In some examples, each antenna array element included in a linear antenna array can be associated with the same beam angle. For instance, each antenna array element included in a given linear antenna array can be associated with a beam angle based on a curvature of the lens associated with the given linear antenna array (e.g., a curvature of the lens in a power direction associated with the lens). In some cases, each respective cylindrical lens included in the plurality of cylindrical lenses can have the same power direction and/or can have a same non-power direction. In some aspects, the beamforming device can steer an RF beam along an elevation direction (e.g., non-power direction of the plurality of cylindrical lenses) by using phase array action or phased array beamforming. In some examples, the beamforming device can steer an RF beam along the elevation direction based on the phased array action of the plurality of antenna array elements included in the linear antenna array associated with a given lens. For example, the plurality of antenna array elements included in a linear antenna array can be aligned in the non-power direction of the given lens.

In some examples, the beamforming device can steer an RF beam along an azimuthal direction (e.g., power direction of the plurality of cylindrical lenses) by selecting a linear antenna array. For example, each linear antenna array can be associated with a corresponding cylindrical lens of the plurality of cylindrical lenses, where each cylindrical lens is associated with a different beam forming angle (e.g., a different azimuthal direction).

In some aspects, the beamforming device can include a cylindrical lens array that includes a plurality of cylindrical lenses. For example, the cylindrical lens array can include at least one skewed cylindrical lens and at least one non-skewed cylindrical lens. In some aspects, the cylindrical lens array can include a plurality of skewed cylindrical lenses, wherein the respective skewed cylindrical lenses included in the plurality of skewed cylindrical lenses are skewed in different directions or orientations. Each cylindrical lens of the cylindrical lens array can have a planar surface and a curved (or convex) surface that is opposite the planar surface. In some examples, the power direction of each cylindrical lens can correspond to a curvature of the curved surface and the non-power direction can be orthogonal to the power direction. In some cases, at least one linear antenna array can be positioned or arranged behind the respective planar surface of each cylindrical lens included in the cylindrical lens array, in a direction that is perpendicular to the power direction. In some aspects, the UE may select one of the linear antenna arrays (e.g., and the associated skewed or non-skewed cylindrical lens of the cylindrical lens array) to direct an RF beam along the power direction of the cylindrical lens array. In some examples, the UE may perform phased array beamforming to direct an RF beam along the non-power direction of the cylindrical lens array.

In some aspects, the systems and techniques can provide a beamforming device that can have a reduced complexity (e.g., less hardware/software complexity) and consumes less power than a device that includes a rectangular antenna array. In some examples, the beamforming device can be used to concurrently steer multiple RF beams in different directions.

Various aspects of the systems and techniques described herein will be discussed below with respect to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example of a wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
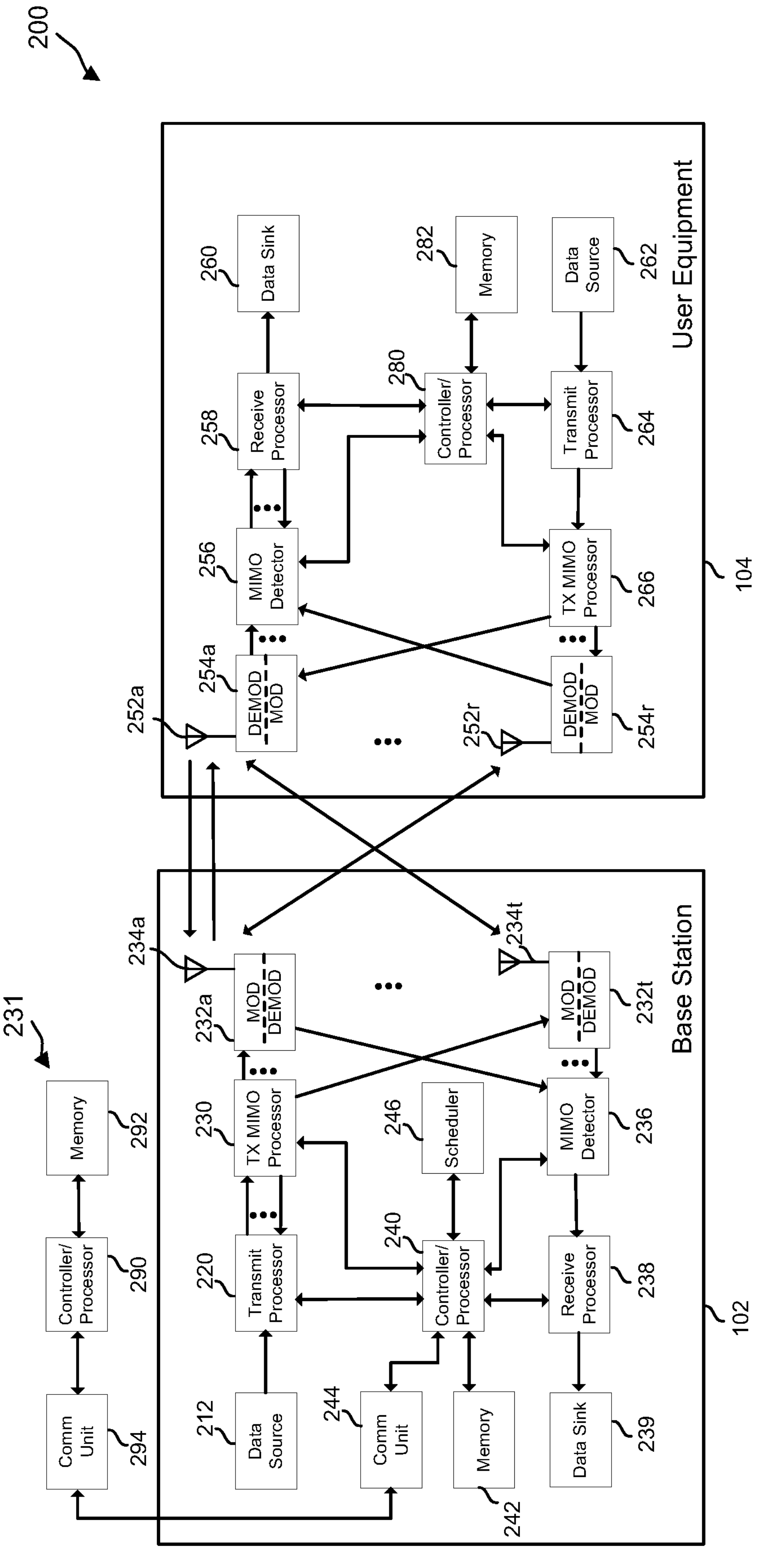
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234*a* through 234*t*, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
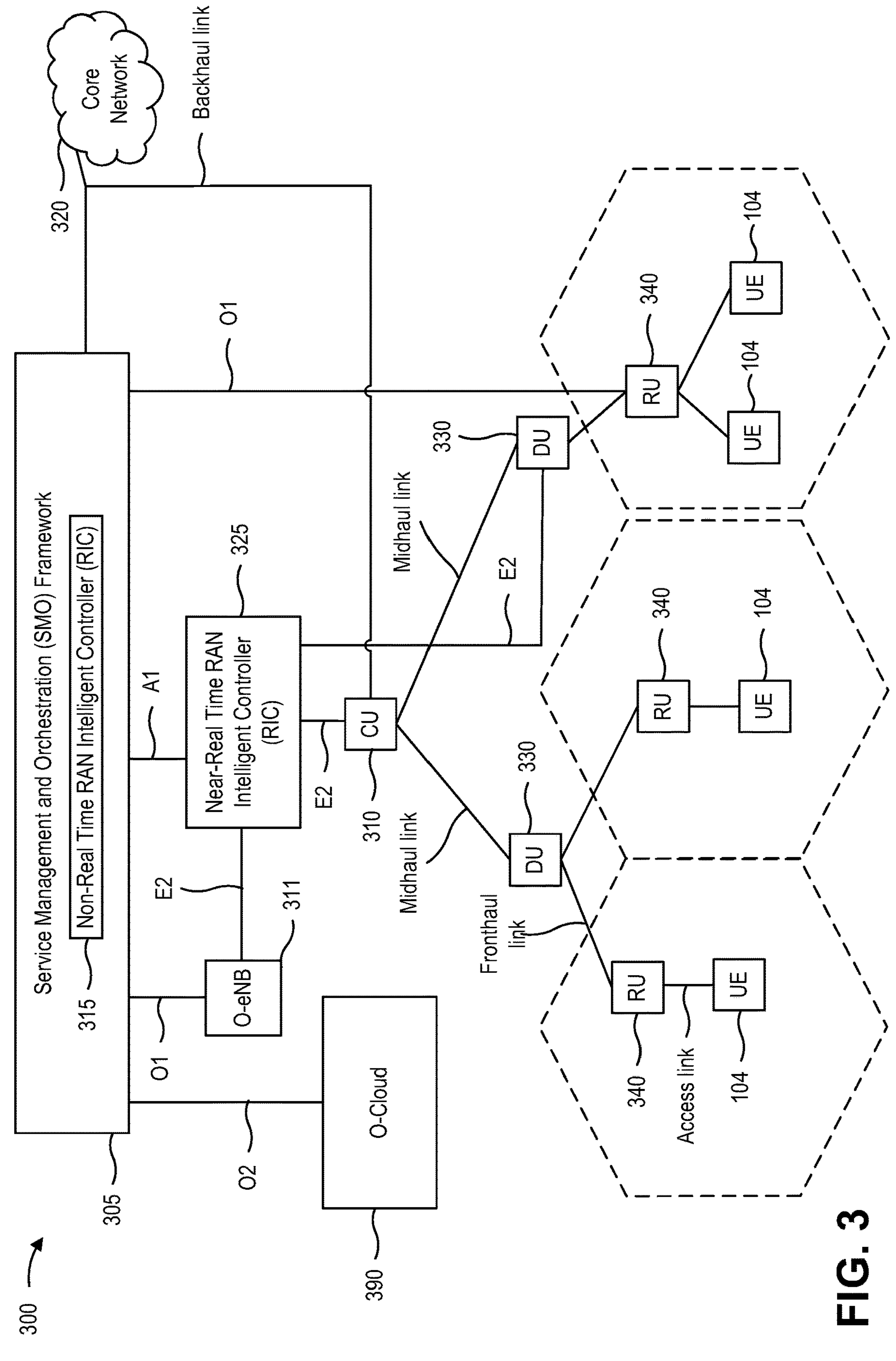
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation, and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
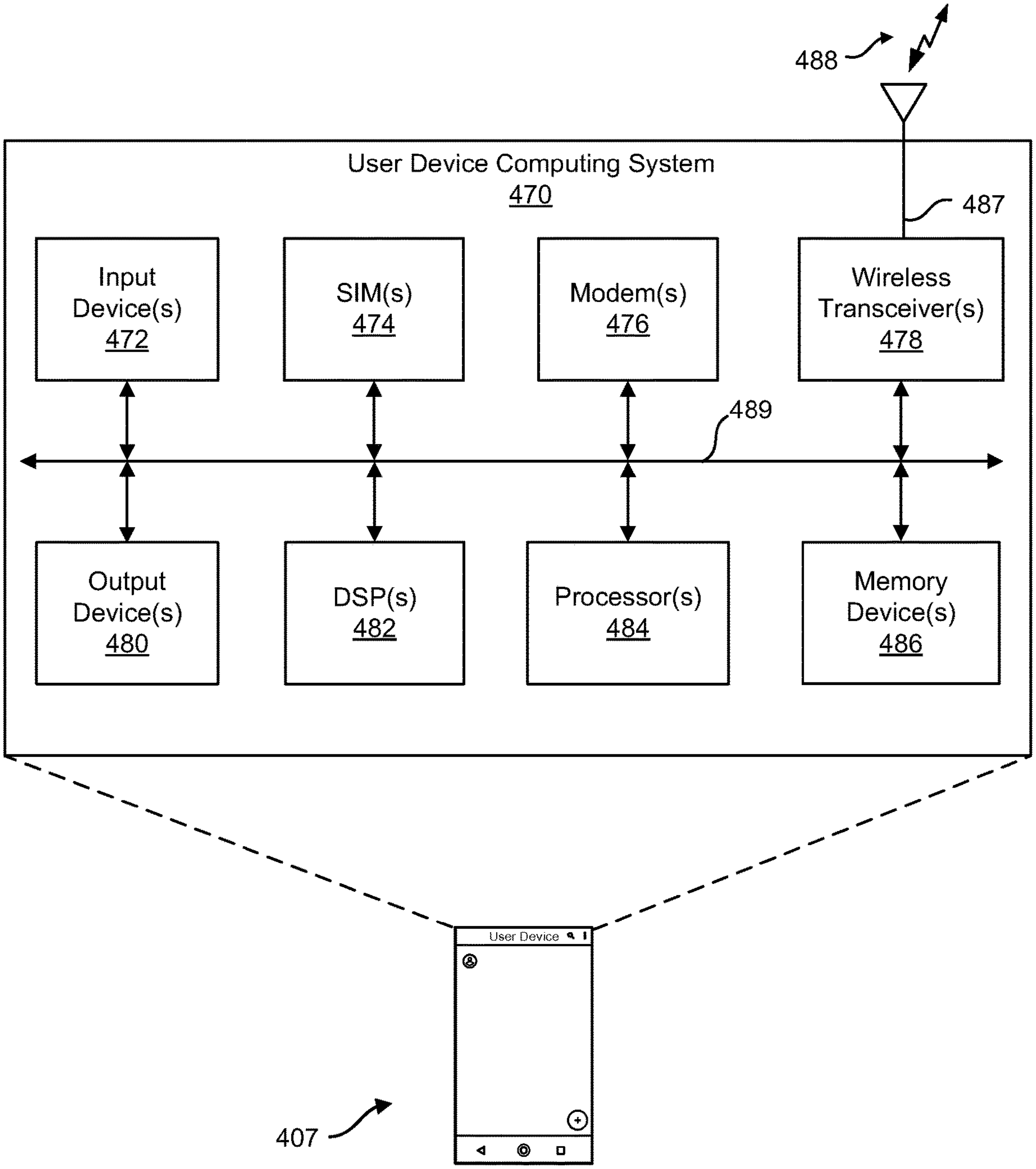
FIG. 4 is a block diagram illustrating components of a user equipment, in accordance with some examples.

FIG. 4 illustrates an example of a computing system 470 of a wireless device 407. The wireless device 407 can include a client device such as a UE (e.g., UE 104, UE 152, UE 190) or other type of device (e.g., a station (STA) configured to communication using a Wi-Fi interface) that can be used by an end-user. For example, the wireless device 407 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICs, FPGAs, APs, GPUs, VPUs, NSPs, microcontrollers, dedicated hardware, any combination thereof, and/or other processing device or system. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 can include one or more radio frequency (RF) interfaces configured to transmit and/or receive RF signals. In some examples, an RF interface can include components such as modem(s) 476, wireless transceiver(s) 478, and/or antennas 487. The one or more wireless transceivers 478 can transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that radio frequency (RF) signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 can be configured to transmit RF signals for performing sidelink communications via antenna 487 in accordance with one or more transmit power parameters that can be associated with one or more regulation modes. Wireless transceivers 478 can also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the AES and/or DES standard) transmitted and/or received by the one or more wireless transceivers 478.

The one or more SIMs 474 can each securely store an international mobile subscriber identity (IMSI) number and related key assigned to the user of the wireless device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a Wi-Fi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

As noted above, systems and techniques are described herein for radio frequency (RF) beamforming. In some cases, the systems and techniques can be implemented by a user equipment (UE) such as UE 104. In some aspects, the systems and techniques can be used to perform hybrid beamforming in which the direction of an RF beam is based on the linear antenna array selected for beamforming (e.g., array selection beamforming) and/or the phasing of the antenna elements within the selected linear antenna array (e.g., phased array beamforming). In some aspects, array selection beamforming can be used to steer an RF beam along the power direction of a cylindrical lens. In some examples, phased array beamforming can used to steer an RF beam along a non-power direction of a cylindrical lens that is orthogonal to the power direction of the cylindrical lens. For example, the power direction of a lens (e.g., including a cylindrical lens) can run along the curved length of the lens. The power direction of a lens is the axis of the lens with optical power. The non-power direction of a lens (e.g., including a cylindrical lens) is orthogonal to the power direction (e.g., as mentioned above), and runs along the length of the lens without any optical power. For example, the length of a cylindrical lens along the non-power direction can be extended and/or shortened without changing the optical power of the lens. Changing the length of a cylindrical lens along the power direction can change the optical power of the cylindrical lens.

Figure 5:
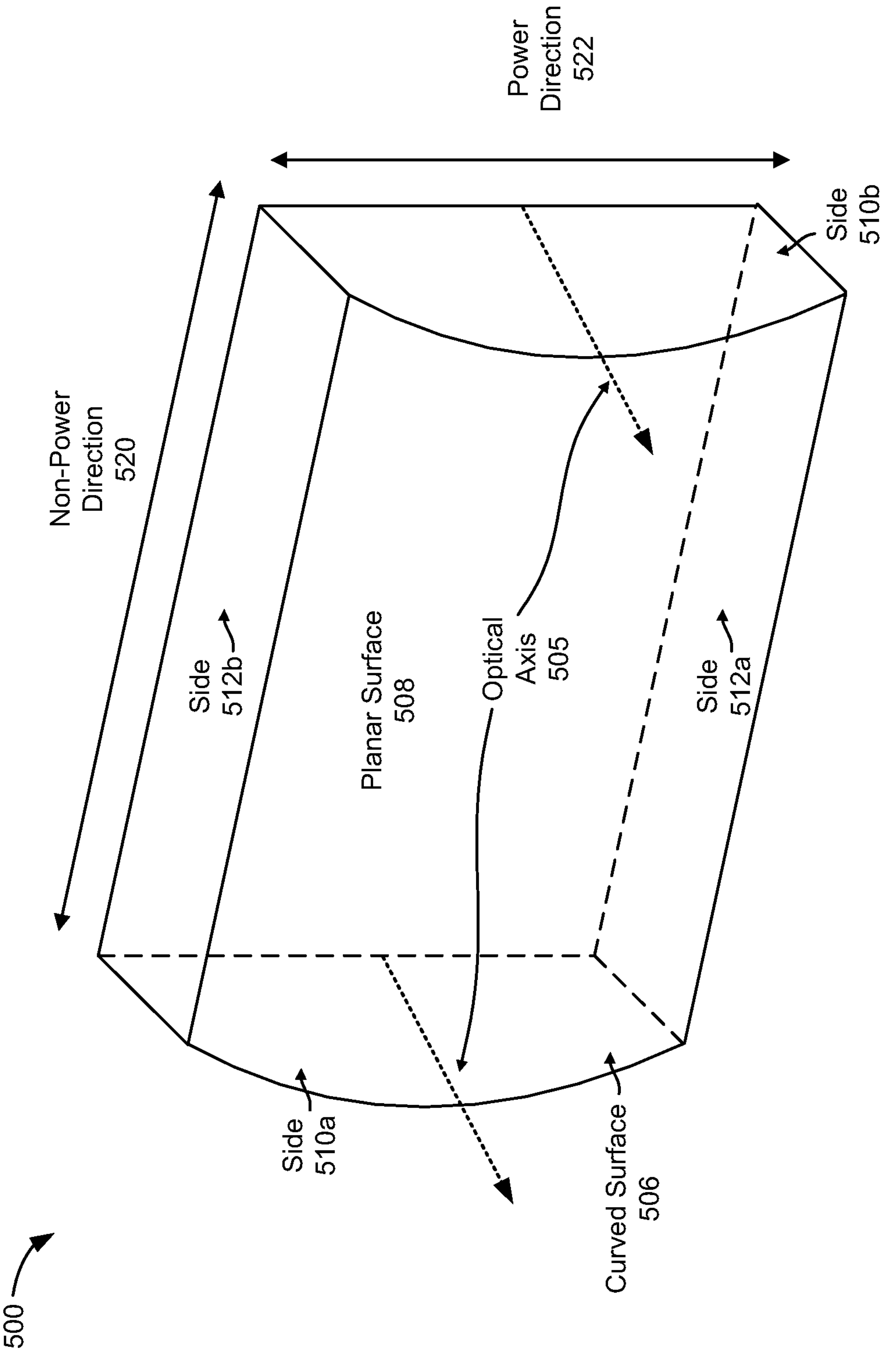
FIG. 5 is a diagram illustrating an example of a cylindrical lens for use with a beamforming device, in accordance with some examples.

FIG. 5 illustrates an example of cylindrical lens 500 for use with a beamforming device. In some aspects, cylindrical lens 500 can include a curved surface 506 that may be used to converge or diverge radio frequency (RF) beams. As illustrated, curved surface 506 corresponds to a convex surface that may converge RF beams. In some examples, cylindrical lens 500 can have a planar surface 508 that is opposite the curved surface 506. In some aspects, a cylindrical lens having a planar surface that is opposite a concave curved surface (e.g., such as cylindrical lens 500 and curved surface 506, respectively) may be referred to as a plano-convex lens or a plano-convex cylindrical lens. In some aspects, a cylindrical lens having a planar surface that is opposite a concave curved surface may be referred to as a plano-concave lens or a plano-concave cylindrical lens. For example, cylindrical lens 500 may be a plano-concave lens when the curved surface 506 is concave.

In some examples, a cylindrical lens (e.g., such as cylindrical lens 500) can be an acylindrical lens. An acylindrical lens may have a curved surface that is opposite to a planar surface, wherein the curved surface has a variable or non-constant curvature. For example, an acylindrical lens may be the cylindrical counterpart to an aspheric lens. In some aspects, a cylindrical lens (e.g., such as cylindrical lens 500) can be a round plano-convex lens or a round plano-concave lens. In some examples, a cylindrical lens (e.g., such as cylindrical lens 500) can be a cylindrical doublet lens or a Powell lens, among other types of cylindrical lenses.

In some cases, the planar surface 508 may be a flat surface (e.g., without any curvature, or with a curvature of 0). In some aspects, cylindrical lens 500 can have a power direction 522 that corresponds to a curvature of curved surface 506 (e.g., the power direction 522 runs along the width of the lens with optical power, aligned in the same direction as the curvature of curved surface 506). In some cases, cylindrical lens 500 can have a non-power direction 520 that is orthogonal to the power direction 522 (e.g., the non-power direction 520 runs along the length of the lens without optical power).

In some examples, cylindrical lens 500 can include side 510*a* and side 510*b* that are opposite to each other and run alongside the curvature of curved surface 506 (e.g., side 510*a* and side 510*b* are parallel to power direction 522). In some cases, cylindrical lens 500 may have side 512*a* and side 512*b* that are opposite to each other and are parallel to the non-power direction 520. Although cylindrical lens 500 is illustrated having a rectangular form factor, those skilled in the art will recognize that additional form factors (e.g., square, circular, elliptical, etc.) may be used in accordance with the present technology.

In some examples, cylindrical lens 500 can be asymmetric cylindrical lens (e.g., also referred to herein as a "non-skewed lens" or a "non-skewed cylindrical lens"). In some cases, a symmetric cylindrical lens can have reflection symmetry about one or more axes that pass through the lens and/or are aligned with the lens. For example, cylindrical lens 500 can be a symmetrical cylindrical lens based on having reflection symmetry about the non-power direction 520 and/or the power direction 522. In some aspects, a symmetric cylindrical lens can have a curvature that is symmetric in or along the power direction of the symmetric cylindrical lens. For example, the curvature of curved surface 506 of cylindrical lens 500 can be symmetric in or along the power direction 522.

A cylindrical lens can include an optical axis that is orthogonal to both the non-power direction and the power-direction of the lens. For example, cylindrical lens 500 can include an optical axis 505 that is orthogonal to the non-power direction 520 and orthogonal to the power direction 522. In some cases, for a three-dimensional cylindrical lens, the power direction can be aligned along a first of three dimensions or axes, the non-power direction can be aligned along a second of three dimensions or axes, and the optical axis can be aligned along the third of three dimensions or axes. In some aspects, the "optical axis" of a cylindrical lens (e.g., cylindrical lens 500) may refer to an optical plane (e.g., the plane including both of the two optical axis lines 505 illustrated in FIG. 5). Similarly, a focal point of a cylindrical lens may refer to a point along a focal line of the cylindrical lens (e.g., the focal line can be included in the optical plane of the cylindrical lens). In some aspects, the optical axis of a lens (e.g., such as a cylindrical lens) can be the straight line passing through the geometrical center of the lens and joining the two centers of curvature of two opposing surfaces of the lens (e.g., a front surface and a rear surface). The center of curvature of a lens surface or lens face can be the center of an imaginary sphere, of part of which the lens is formed. For example, optical axis 505 of cylindrical lens 500 can pass through or otherwise join the respective centers of curvature of the planar surface 508 and the curved surface 506.

In some aspects, a symmetric cylindrical lens can have an optical axis that is aligned with a center of the symmetric cylindrical lens along the power direction. For example, optical axis 505 of cylindrical lens 500 (e.g., which may be a symmetric cylindrical lens) can be aligned with a center of cylindrical lens 500 along the power direction 522. In one illustrative example, cylindrical lens 500 may be a symmetric cylindrical lens based on the optical axis 505 being aligned with a center point of the line connecting planar surface 508 to the respective sides 510*a*, 510*b* (e.g., optical axis 505 can divide the respective sides 510 and 510*b* into two equal and symmetric portions).

In some cases, cylindrical lens 500 can be included in and/or used for a radio frequency (RF) beamforming device. For example, cylindrical lens 500 can be used in a hybrid beamforming device that also includes multiple phased antenna arrays. In some examples, a hybrid beamforming device can steer an RF beam along an elevation direction (e.g., non-power direction 520 of the cylindrical lens 500) by using phase array action (e.g., phased array beamforming). In some cases, a hybrid beamforming device can steer an RF beam along an azimuthal direction (e.g., power direction 522 of cylindrical lens 500) by selecting an antenna array. For example, azimuthal RF beam steering can be performed for cylindrical lens 500 using array selection beamforming based on an array position relative to the power direction 522 of the cylindrical lens 500.

Figures 6A, 6B:
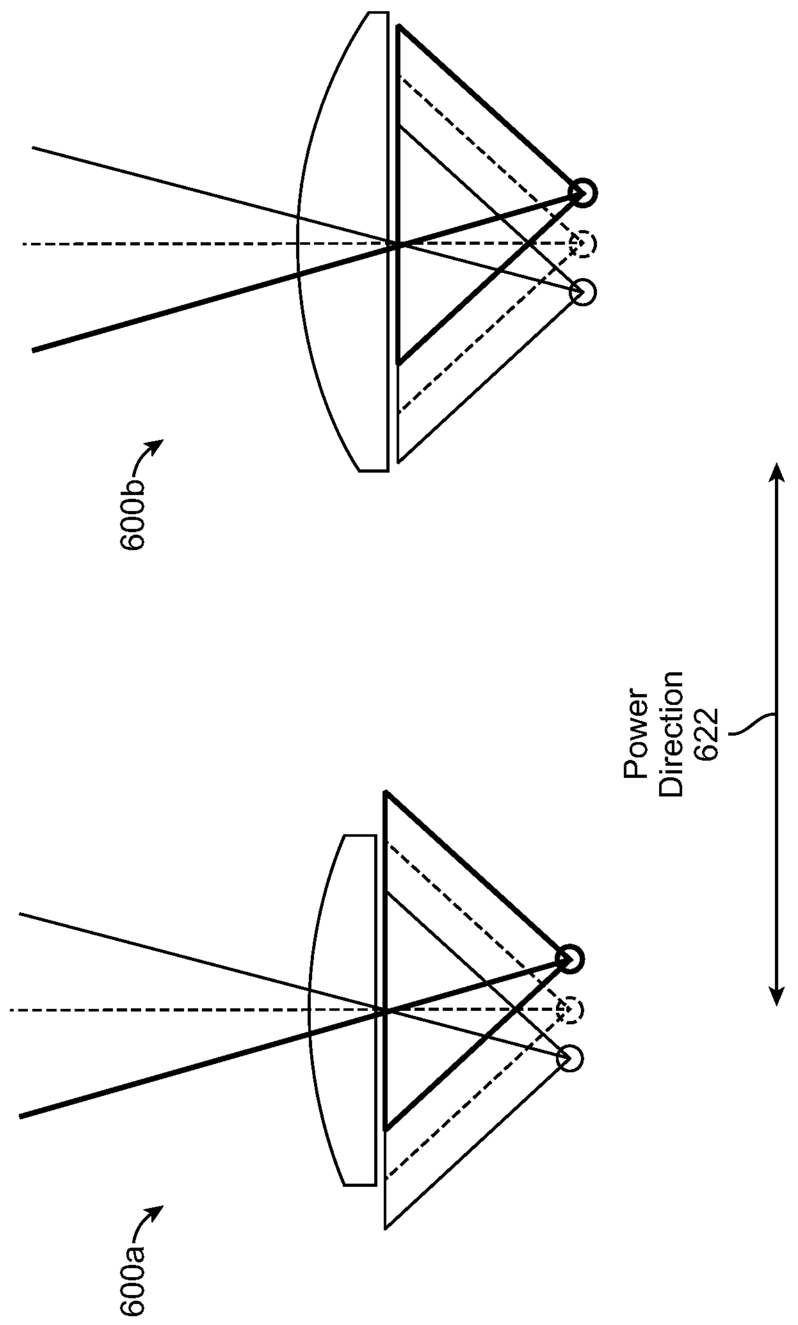
FIG. 6A is a diagram illustrating an example of array selection beamforming that can be performed using a non-skewed cylindrical lens, in accordance with some examples.
FIG. 6B is a diagram illustrating another example of array selection beamforming that can be performed using a non-skewed cylindrical lens, in accordance with some examples.

In some examples, the use of a symmetric or non-skewed cylindrical lens to perform RF beam steering (e.g., azimuthal RF beam steering) for a plurality of different array positions can be associated with inefficiencies such as power loss. For example, FIG. 6A is a diagram illustrating an example of array selection beamforming that can be performed based on an array position relative to a non-skewed cylindrical lens 600*a*. In some cases, the non-skewed cylindrical lens 600*a* can be the same as or similar to the cylindrical lens 500 illustrated in FIG. 5.

As illustrated in FIG. 6A, array selection beamforming can be performed using cylindrical lens 600*a* by selecting between three different antenna arrays that are disposed proximate to a planar surface of the cylindrical lens 600*a*. For example, antenna arrays (e.g., such as the three different antenna arrays illustrated in FIG. 6A) that are disposed proximate to a planar surface of a cylindrical lens (e.g., such as cylindrical lens 600*a*) can be disposed at or along a focal line associated with the cylindrical lens. The focal line associated with a cylindrical lens can be parallel to the non-power direction of the cylindrical lens, wherein the focal points resolved by the cylindrical lens are located along the focal line. In one illustrative example, antenna arrays disposed proximate to the planar surface of a cylindrical lens can be disposed at the focal length of the cylindrical lens (e.g., wherein the focal length is the distance between the planar surface of the lens and the focal line associated with the lens). For example, a cylindrical lens (e.g., such as cylindrical lens 600*a*) may have a focal length of 2.33 millimeters (mm). Antenna arrays disposed proximate to a cylindrical lens with a focal length of 2.33 mm can be disposed 2.33 mm away from the planar surface of the cylindrical lens. In some aspects, the antenna arrays disposed proximate to the planar surface of cylindrical lens 600*a* can be parallel to one another and/or can be parallel to the planar surface of cylindrical lens 600*a*. In some examples, each respective antenna array can be disposed proximate to the planar surface of cylindrical lens 600*a* at the same offset distance (e.g., the focal length of the cylindrical lens 600*a*). A left-most antenna array may be offset to the left of an optical axis of cylindrical lens 600*a* (e.g., is offset from a center point of the cylindrical lens 600*a* in the power direction 622). A center antenna array may be aligned with optical axis of cylindrical lens 600*a*, and a right-most antenna array may be offset to the right of the optical axis of cylindrical lens 600*a*. In some examples, each antenna array of a plurality of antenna arrays can be disposed proximate to a different cylindrical lens. For example, a first antenna array can be disposed proximate to a planar surface of a first cylindrical lens (e.g., offset by the focal length of the first cylindrical lens), a second antenna array can be disposed proximate to a planar surface of a second cylindrical lens (e.g., offset by the focal length of the second cylindrical lens), and a third antenna array can be disposed proximate to a planar surface of a third cylindrical lens (e.g., offset by the focal length of the third cylindrical lens). In some examples, the focal length of each cylindrical lens can be the same, and each antenna array included in a plurality of antenna arrays can be disposed proximate to the respective planar surface of each cylindrical lens at the same offset distance (e.g., the common focal length shared between the cylindrical lenses).

Based at least in part on the offset between the left-most antenna array and the optical axis of non-skewed cylindrical lens 600*a*, a beam associated with the left-most antenna array can be steered to the right, in the power direction 622, by the non-skewed cylindrical lens 600*a*. Based at least in part on the offset between the right-most antenna array and the optical axis of non-skewed cylindrical lens 600*a*, a beam associated with the right-most antenna array can be steered to the left, in the power direction 622, by the non-skewed cylindrical lens 600*a*. A beam associated with the center antenna array can be transmitted along the optical axis of the non-skewed cylindrical lens 600*a* without beam steering, based on the alignment (e.g., lack of offset) between the center antenna array and the optical axis of non-skewed cylindrical lens 600*a*. It is noted that the three beams depicted in FIG. 6A and/or FIG. 6B (e.g., associated with the three respective antenna arrays) are provided as illustrations of a beam pattern that may be associated with or generated by each respective antenna array.

In some aspects, the use of non-skewed cylindrical lens 600*a* to perform RF beam steering can be associated with power loss due to the lens aperture of non-skewed cylindrical lens 600*a* being smaller than the beam width generated by the set of antenna arrays. For example, the beam associated with the left-most antenna array is wider than non-skewed cylindrical lens 600*a* and the beam associated with the right-most antenna array is wider than non-skewed cylindrical lens 600*a*. In some cases, the portion of a beam that is not coupled into or transmitted through a lens can represent lost power (e.g., based on a difference between the beam power transmitted by the set of antenna arrays and the beam power coupled into the lens).

In some examples, a wider lens could be used to perform array selection beamforming for the three antenna arrays depicted in FIG. 6A, such that the lens is at least as wide as the total beam width generated by or associated with the set of antenna arrays. In some aspects, a wider lens can be used to capture a greater percentage or a greater amount of the total power that is transmitted from non-center antenna arrays (e.g., in the example of FIG. 6B, to capture a greater percentage or amount of the total power that is transmitted from the left-most antenna array and/or the right-most antenna array). For example, FIG. 6B is a diagram illustrating an example of array selection beamforming that includes the same three antenna arrays, and associated beams, that are depicted in FIG. 6A. FIG. 6B also illustrates a non-skewed cylindrical lens 600*b* that is wider, in the power direction 622, than the non-skewed cylindrical lens 600*a* illustrated in FIG. 6A. In some cases, the non-skewed cylindrical lens 600*b* can be the same as or similar to the non-skewed cylindrical lens 500 illustrated in FIG. 5.

However, widening the non-skewed cylindrical lens 600*a* (e.g., to obtain the non-skewed cylindrical lens 600*b*) may also be associated with increasing the thickness of the lens. For example, non-skewed cylindrical lens 600*b* is both wider and thicker (e.g., taller) than the non-skewed cylindrical lens 600*a*. In some cases, increasing lens thickness can negatively impact a useful focal length of the lens. For example, increasing the thickness of a cylindrical lens and maintaining the same focal length may be associated with increased aberrations. Increased lens thickness may also result in protrusions or increased dimensions when integrating the non-skewed cylindrical lens 600*b* into an RF beamforming device or User Equipment (UE).

There is a need for systems and techniques that can be used to implement RF beamforming devices that include lenses with a reduced physical size or footprint. There is further a need for systems and techniques that can be used to implement RF beamforming devices that include lenses with a reduced physical size or footprint but do not reduce power efficiency and/or do not increase focal length.

Systems and techniques are described herein for radio frequency (RF) beamforming. In some aspects, a beamforming device can be implemented that includes a plurality of lenses (e.g., cylindrical lenses) and multiple phased antenna arrays. In one illustrative example, the plurality of lenses can include a plurality of differently skewed lenses (e.g., at least one skewed cylindrical lens and at least one differently skewed cylindrical lens). In one illustrative example, the plurality of lenses can include at least one non-skewed cylindrical lens and one or more skewed cylindrical lenses. The skewed and non-skewed cylindrical lenses can each be associated with a different beam forming angle. In some aspects, each lens of the plurality of lenses can be associated with at least one phased antenna array. In some examples, each lens of the plurality of lenses can be associated with at least one linear antenna array including a plurality of antenna array elements.

In one illustrative example, each antenna array element included in a linear antenna array can be associated with the same beam angle. For example, each antenna array element included in a given linear antenna array can be associated with a beam angle based on a curvature of the lens associated with the given linear antenna array (e.g., a curvature of the lens in the power direction).

In some examples, the plurality of cylindrical lenses can have the same non-power direction and the same power direction. In some aspects, the beamforming device can steer an RF beam along an elevation direction (e.g., non-power direction of the plurality of cylindrical lenses) by using phase array action or phased array beamforming. In some examples, the beamforming device can steer an RF beam along the elevation direction based on the selection of an antenna array element from the plurality of antenna array elements included in the linear antenna array associated with a given lens. For example, the plurality of antenna array elements included in a linear antenna array can be aligned in the non-power direction of the given lens.

In some examples, the beamforming device can steer an RF beam along an azimuthal direction (e.g., power direction of the plurality of cylindrical lenses) by selecting a linear antenna array. For example, each linear antenna array can be associated with a corresponding one of the plurality of cylindrical lenses, and each cylindrical lens may be associated with a different beam forming angle (e.g., a different azimuthal direction).

Figure 7A:
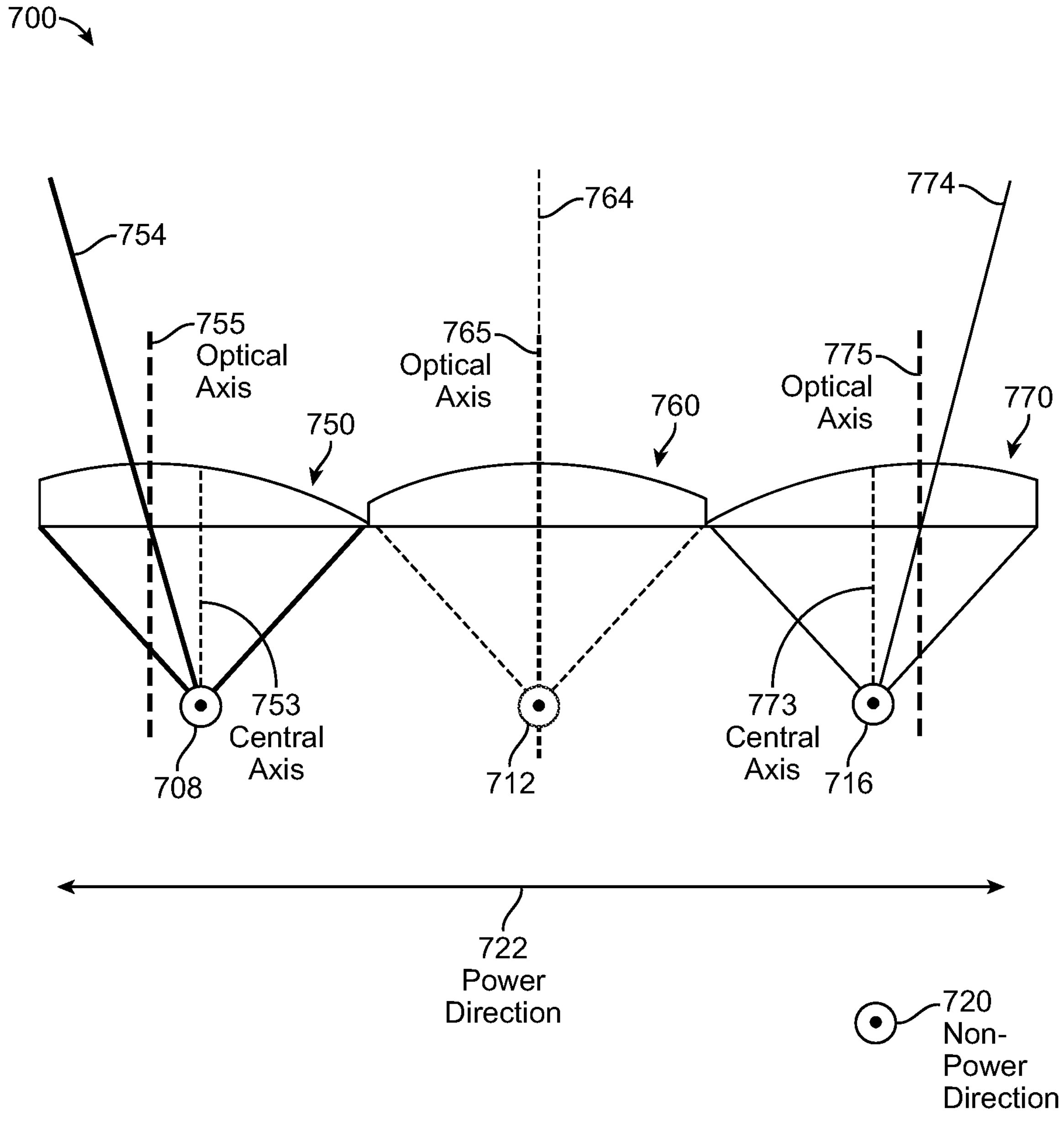
FIG. 7A is a diagram illustrating an example of a radio frequency (RF) beamforming lens array that includes a plurality of cylindrical lenses, in accordance with some examples.

FIG. 7A is a diagram illustrating an example of an RF beamforming lens array 700 that includes a plurality of cylindrical lenses. In some examples, the lens array 700 can be the same as or similar to the lens array 800 illustrated in FIG. 8 (e.g., described below). For example, in some cases the diagram of FIG. 7A may present a side view of the perspective view illustrated in FIG. 8.

The lens array 700 may be associated with a power direction 722 and a non-power direction 720 (e.g., non-power direction 720 is shown as the direction into/out of the page). For example, each lens of the plurality of lenses included in lens array 700 can be associated with the same power direction 722 and the same non-power direction 720. In some examples, the power direction 722 and the power direction 822 (e.g., illustrated in FIG. 8) are the same, and the non-power direction 720 and the non-power direction 820 (e.g., illustrated in FIG. 8) are the same.

The lens array 700 illustrated in FIG. 7A can include a first skewed cylindrical lens 750, a non-skewed cylindrical lens 760 (e.g., a differently skewed cylindrical lens), and a second skewed cylindrical lens 770. In some cases, the non-skewed cylindrical lens 760 can be the same as or similar to the non-skewed cylindrical lens 500 illustrated in FIG. 5. In some examples, the first skewed cylindrical lens 750 can be the same as or similar to the skewed cylindrical lens 850 illustrated in FIG. 8, the second skewed cylindrical lens can be the same as or similar to the skewed cylindrical lens 870 illustrated in FIG. 8, and/or the non-skewed cylindrical lens 760 can be the same as or similar to the non-skewed cylindrical lens 860 illustrated in FIG. 8. In some aspects, one or more (or both) of non-skewed cylindrical lens 760 and/or non-skewed cylindrical lens 860 may also be referred to herein as a "differently skewed lens" or a "differently skewed cylindrical lens."

In some aspects, a skewed cylindrical lens (e.g., also referred to as an "asymmetric cylindrical lens) can include at least one curved surface with a curvature that is asymmetric in or along the power direction of the skewed cylindrical lens. For example, the skewed cylindrical lenses 750 and 770 can each include a flat or planar bottom surface and a curved upper surface. The curved upper surfaces of skewed cylindrical lenses 750 and 770 each have a curvature that is asymmetric along the power direction 722. For example, the curvature of the upper surface of first skewed cylindrical lens 750 is larger to the right of central axis 753 and smaller to the left of central axis 753. The curvature of the upper surface of second skewed cylindrical lens 770 is larger to the left of central axis 773 and smaller to the right of central axis 773.

A thickness of the first skewed cylindrical lens 750 (e.g., the distance between the planar bottom surface and the curved upper surface) may also be asymmetric along the power direction 722, with first skewed cylindrical lens 750 having a larger thickness to the left of central axis 753 (e.g., in the area of lesser curvature) and a smaller thickness to the right of central axis 753 (e.g., in the area of greater curvature).

A thickness of the second skewed cylindrical lens 770 (e.g., the distance between the planar bottom surface and the curved upper surface) may also be asymmetric along the power direction 722, with second skewed cylindrical lens 770 having a larger thickness to the left of central axis 753 (e.g., in the area of lesser curvature) and a smaller thickness to the right of central axis 753 (e.g., in the area of greater curvature).

Figure 8:
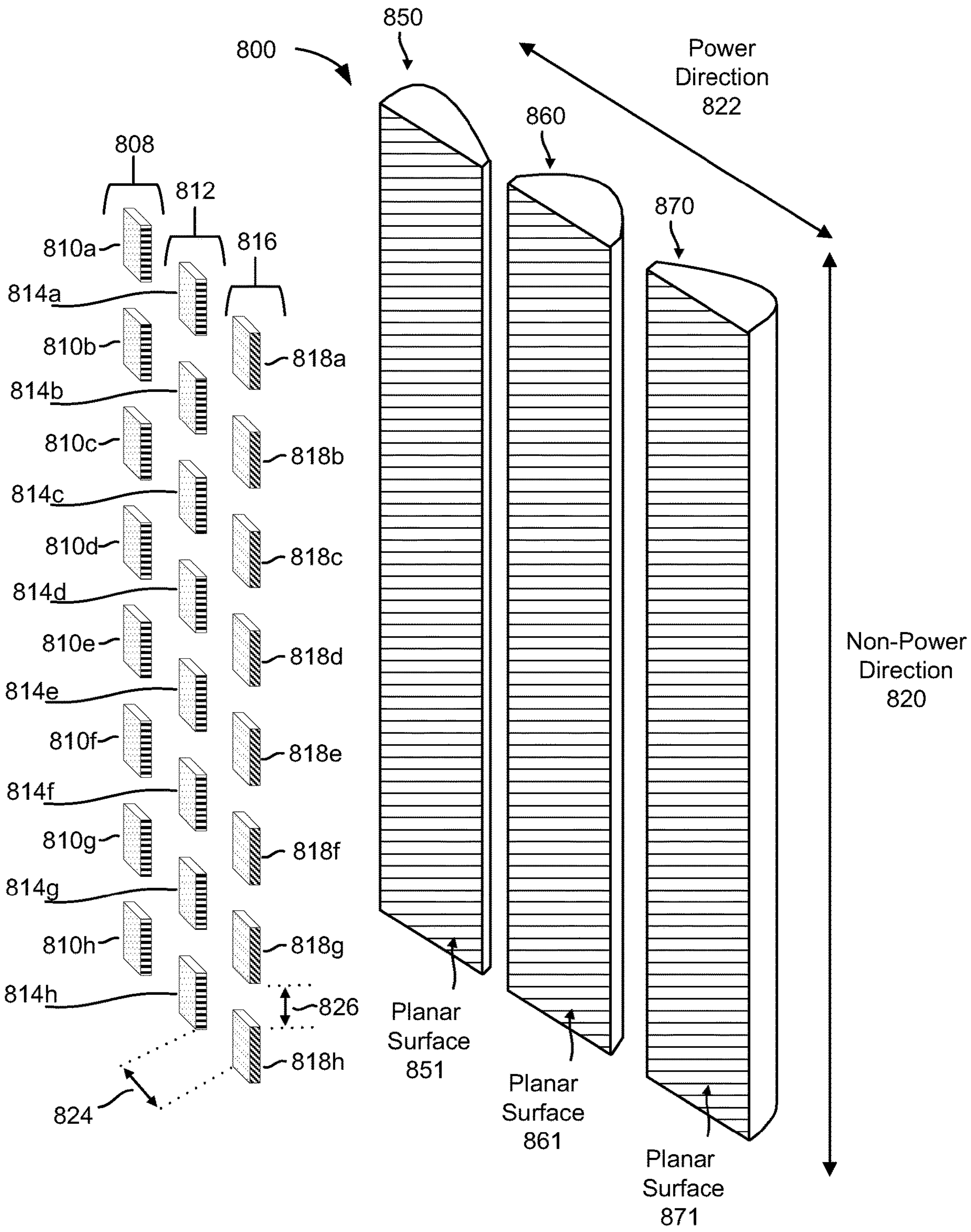
FIG. 8 is a diagram illustrating portions of a beamforming device with a cylindrical lens array that includes a plurality of cylindrical lenses, in accordance with some examples.

In some examples, the first skewed cylindrical lens 750 can be the same as or similar to the skewed cylindrical lens 850 illustrated in FIG. 8 and the second skewed cylindrical lens 770 can be the same as or similar to the skewed cylindrical lens 870 illustrated in FIG. 8. As illustrated in FIG. 8, the first skewed cylindrical lens 850 and the second skewed cylindrical lens 870 are both asymmetric in thickness and curvature along the power direction 822.

As mentioned previously, a cylindrical lens can have an optical axis that is orthogonal to both the non-power direction and the power-direction of the lens. For example, the cylindrical lenses 750, 760, and 770 illustrated in FIG. 7A are associated with the respective optical axes 755, 765, and 775. As illustrated, the optical axes 755, 765, and 775 are each orthogonal to the power direction 722 and orthogonal to the non-power direction 720.

In some aspects, non-skewed (e.g., symmetric) cylindrical lenses can have an optical axis that is aligned with a center of the non-skewed cylindrical lens along the power direction. For example, optical axis 765 of non-skewed cylindrical lens 760 can be aligned with a center point and/or central axis of the non-skewed cylindrical lens 760 along the power direction 722. In some aspects, the optical axis 765 can be the same as the central axis, along the power direction 722, of non-skewed cylindrical lens 760. For example, the central axis along the power direction 722 of non-skewed cylindrical lens 760 can be the line that is orthogonal to the midpoint of the bottom planar surface of non-skewed cylindrical lens 760 (e.g., the same line as optical axis 765, as illustrated in FIG. 7A). In some aspects, non-skewed cylindrical lens 760 may be provided as a skewed cylindrical lens that is differently skewed than either the first cylindrical lens 750 and/or the second skewed cylindrical lens 770. For example, when non-skewed cylindrical lens 760 is instead provided as a differently skewed cylindrical lens 760, the differently skewed cylindrical lens can have an optical axis that is offset from a center of the differently skewed lens along the power direction, wherein the offset amount or offset distance is different than a respective offset amount or distance associated with either the first skewed cylindrical lens 750 or the second skewed cylindrical lens 770.

In some aspects, skewed (e.g., asymmetric) cylindrical lenses can have an optical axis that is offset from (e.g., not aligned with) a center of the skewed cylindrical lens along the power direction. For example, optical axis 755 of skewed cylindrical lens 750 is offset to left of the central axis 753, and optical axis 775 of skewed cylindrical lens 770 is offset to the right of the central axis 773. In some examples, the optical axis of a skewed cylindrical lens can be located at the point of maximum thickness of the skewed cylindrical lens.

In some examples, a radio frequency (RF) beam transmitted through a skewed cylindrical lens (e.g., such as skewed cylindrical lenses 750 and 770) can be steered to a beam angle that is based at least in part on the asymmetric curvature of the curved surface of the skewed cylindrical lens. For example, the first skewed cylindrical lens 750 can be associated with a steered beam 754 having a beam angle (e.g., the angle formed between the steered beam 754 and optical axis 755/central axis 753) that is based at least in part on the asymmetric curvature of the curved upper surface of first skewed cylindrical lens 750. The second skewed cylindrical lens 770 can be associated with a steered beam 774 having a beam angle (e.g., the angle formed between the steered beam 774 and optical axis 775/central axis 773) that is based at least in part on the asymmetric curvature of the curved upper surface of second skewed cylindrical lens 770.

An RF beam transmitted through a non-skewed cylindrical lens can be associated with a beam angle of 0° (e.g., the steered beam is aligned with the optical axis and central axis of the non-skewed cylindrical lens). For example, the non-skewed cylindrical lens 760 can be associated with a steered beam 764 having a beam angle (e.g., the angle formed between the steered beam 764 and the optical/central axis 765) that is equal to zero.

In some aspects, the beam angle associated with an RF beam transmitted through a cylindrical lens, skewed or non-skewed, can be further based on a location from which the RF beam was transmitted to (e.g., into) the cylindrical lens. In the context of the above examples, it was assumed that the respective RF beams were transmitted from a location along the central axis of the respective cylindrical lenses 750, 760, and 770. In some examples, an RF beam may be transmitted to, or into, one or more of the cylindrical lenses 750, 760, and 770 from a location that is offset from the respective central axes 753, 765, and 775, in which case the resulting beam angle can be based on the relative transmission location and the curvature of the curved surface of the cylindrical lens.

In one illustrative example, RF beams (e.g., including the steered beams 754, 764, and 774) can be transmitted using an antenna array and/or antenna array element. For example, each respective cylindrical lens included in lens array 700 (e.g., skewed cylindrical lenses 750, 770 and non-skewed cylindrical lens 760) can be associated with at least one linear antenna array that includes a plurality of antenna array elements. In some examples, the plurality of antenna array elements included in each antenna array can be aligned in the non-power direction 720.

For example, skewed cylindrical lens 750 can be associated with a linear antenna array 708, non-skewed cylindrical lens 760 can be associated with a linear antenna array 712, and skewed cylindrical lens 770 can be associated with a linear antenna array 716. In some aspects, the linear antenna arrays 708, 712, and 716 can be the same as or similar to the linear antenna arrays 808, 812, and 816 illustrated in FIG. 8.

In one illustrative example, one or more (or all) of the linear antenna arrays 708, 712, and 716 (and the linear antenna arrays 808, 812, and 816 illustrated in FIG. 8) can be aligned along the respective central axes of the cylindrical lenses 750, 760, and 770. For example, linear antenna array 708 (and/or linear antenna array 808) can be aligned along the central axis 753 of first skewed cylindrical lens 750, and linear antenna array 716 (and/or linear antenna array 816) can be aligned along the central axis 773 of second skewed cylindrical lens 770. Linear antenna array 712 (and/or linear antenna array 812) can be aligned along the optical axis 765 of non-skewed cylindrical lens 760, which is also the central axis of non-skewed cylindrical lens 760.

As mentioned previously, each linear antenna array can include a plurality of antenna array elements. For example, with reference to FIG. 8, linear antenna array 808 (e.g., which may be the same as or similar to linear antenna array 708) includes the antenna array elements 810*a*-810*h*; linear antenna array 812 (e.g., which may be the same as or similar to linear antenna array 712) includes the antenna array elements 814*a*-814*h*; and linear antenna array 816 (e.g., which may be the same as or similar to linear antenna array 716) includes the antenna array elements 818*a*-818*h*. In one illustrative example, the plurality of antenna array elements included in each linear antenna array (e.g., linear antenna arrays 708, 712, and 716) can be aligned in the non-power direction 720.

In some aspects, a width (e.g., along the power direction 722) of the lens array 700 can be less than or equal to the width of a single, non-skewed cylindrical lens that may be used to perform RF beamforming for the antenna arrays 708, 712, and 716. For example, a width of the lens array 700 can be less than or equal to the width of the single, non-skewed cylindrical lens 600*a* (e.g., illustrated in FIG. 6A performing RF beamforming for a set of three antenna arrays) and/or can be less than or equal to the width of the single, non-skewed cylindrical lens 600*b* (e.g., illustrated in FIG. 6B performing RF beamforming for the same set of three antenna arrays as FIG. 6A). In some cases, the antenna arrays 708, 712, and 716 can be the same as or similar to the set of three antenna arrays illustrated in FIGS. 6A and 6B.

In one illustrative example, the non-skewed cylindrical lens 760 can be located between the first skewed cylindrical lens 750 and the second skewed cylindrical lens 770 (e.g., and the non-skewed cylindrical lens 860 located between the first skewed cylindrical lens 850 and second skewed cylindrical lens 870 illustrated in FIG. 8). In some aspects, each of the three cylindrical lenses 750, 760, and 770 can each include a planar surface opposite from a curved surface. In some examples, the three cylindrical lenses 750, 760, and 770 can be arranged such that their respective planar surfaces form a single, continuous planar surface of lens array 700 (e.g., non-skewed cylindrical lens 760 can be adjacent to and make contact with the first skewed cylindrical lens 750 and the second skewed cylindrical lens 770).

In some aspects, the plurality of cylindrical lenses (e.g., the cylindrical lenses 750, 760, and 770) can be aligned such that their flat planar surfaces (e.g., the flat planar surface opposite to the respective curved surface of each cylindrical lens) are coplanar. For example, FIG. 7A illustrates an example in which the cylindrical lenses 750, 760, and 770 are aligned such that their flat planar surfaces are coplanar, and a distance from the respective flat planar surface of each cylindrical lens to the respective antenna array 708, 712, and 716 is the same. In some aspects, the distance from the respective flat planar surface of each cylindrical lens to the respective antenna array 708, 712, and 716 can be the same as or equal to a focal length of the respective cylindrical lens (e.g., the cylindrical lenses 750, 760, and 770 may have a same focal length).

Figure 7B:
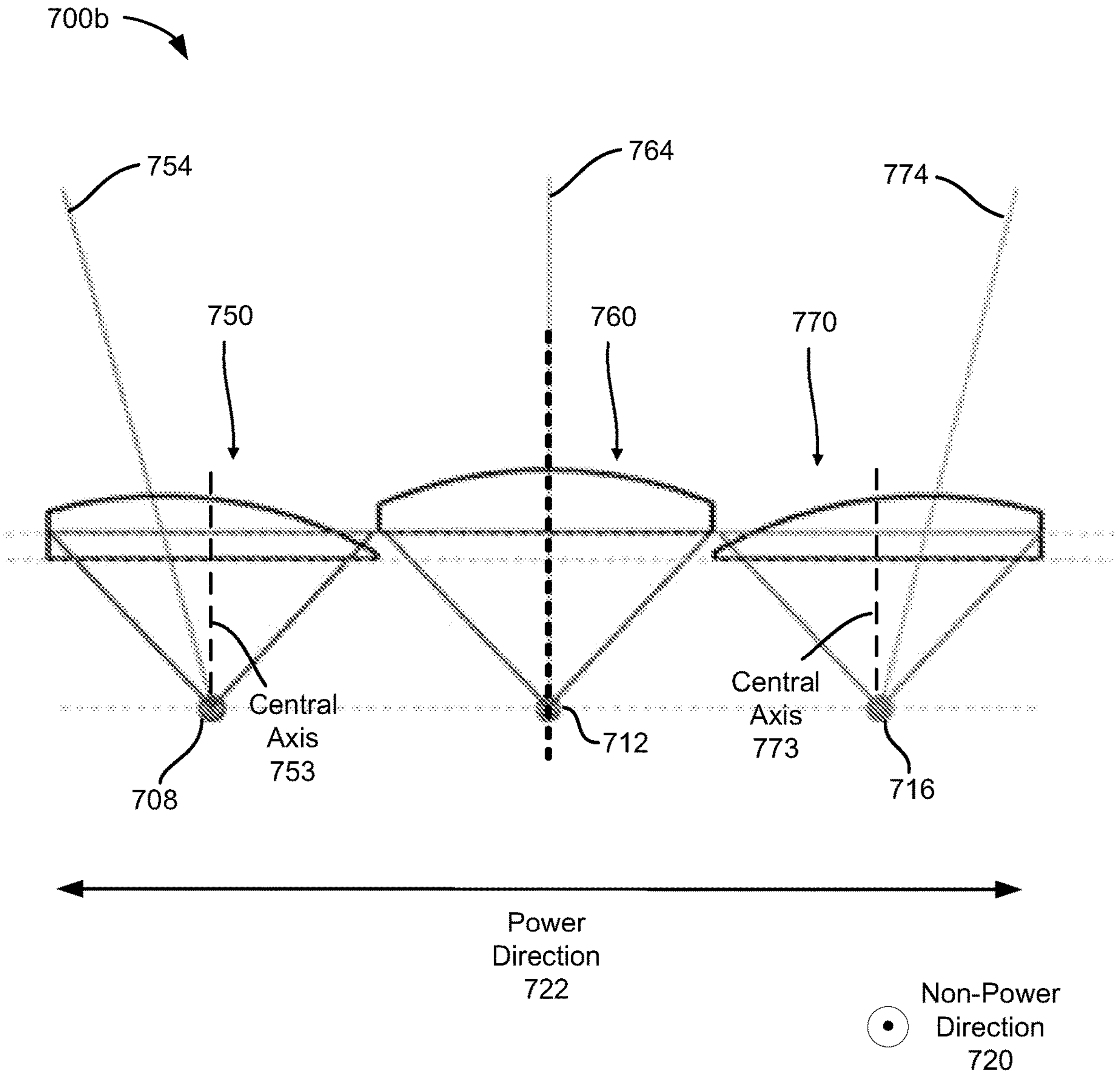
FIG. 7B is a diagram illustrating another example of an RF beamforming lens array that includes a plurality of cylindrical lenses, in accordance with some examples.

In some examples, one or more cylindrical lenses included in the plurality of cylindrical lenses may have different focal lengths (e.g., also referred to as "back focal lengths"). In some aspects, based on placing the antenna array(s) (e.g., antenna arrays 708, 712, 716) at a distance from the flat planar surface of each cylindrical lens that is equal to the back focal length of the cylindrical lens, the flat planar surfaces of the plurality of cylindrical lenses may not be coplanar. For example, FIG. 7B is a diagram illustrating an example of an RF beamforming lens array 700*b* that includes a plurality of cylindrical lenses having different back focal lengths. In some aspects, the plurality of cylindrical lenses can include a first skewed cylindrical lens 750, a differently skewed cylindrical lens 760 (e.g., a non-skewed cylindrical lens), and a second skewed cylindrical lens 770. In some examples, the plurality of cylindrical lenses illustrated in FIG. 7B can be the same as or similar to the respective plurality of cylindrical lenses illustrated in FIG. 7A.

As mentioned previously, in some aspects the cylindrical lenses included in the RF beamforming lens array 700*b* may have one or more different back focal lengths. Based on the different back focal lengths, the cylindrical lenses may be disposed at different distances away from the respective antenna arrays 708, 712, and 716. For example, the cylindrical lens 760 can be disposed at a distance that is farther away from the antenna array 712 than the distance between either cylindrical lens 750 and the antenna array 708 and/or the distance between cylindrical lens 770 and the antenna array 716 (e.g., the cylindrical lens 760 can have a greater back focal length than either of cylindrical lenses 750 or 770). In some aspects, the antenna arrays 708, 712, and 716 can be coplanar with one another (e.g., lying along a same line that is parallel to power direction 722). In some examples, the antenna arrays 708, 712, and 716 can be disposed at different distances from the flat planar surface of each respective cylindrical lens 750, 760, 770, wherein the flat planar surfaces of the respective cylindrical lenses are coplanar with one another and the distance to the corresponding antenna array is based on the back focal length of the respective cylindrical lens.

FIG. 8 is a diagram illustrating portions of an example beamforming device with a plurality of cylindrical lenses, in accordance with some examples. In some aspects, the beamforming device may include cylindrical lenses 850, 860, and 870. In some examples, one or more of the cylindrical lenses 850, 860, and 870 may correspond to a plano convex lens, a bioconvex lens, a convex meniscus lens, a bioconcave lens, a plano concave lens, a concave meniscus lens, and/or any other type of cylindrical lens. As illustrated, cylindrical lens 860 corresponds to a plano convex lens such as the non-skewed (e.g., symmetric) cylindrical lens 500 illustrated in FIG. 5.

In some examples, cylindrical lens 860 can be a non-skewed cylindrical lens (e.g., also referred to herein as "non-skewed cylindrical lens 860") and may be the same as or similar to the non-skewed (e.g., differently skewed) cylindrical lens 760 illustrated in FIGS. 7A and 7B.

In some examples, cylindrical lens 850 can be a skewed or asymmetric cylindrical lens (e.g., also referred to herein as "skewed cylindrical lens 850") and may be the same as or similar to the first skewed cylindrical lens 750 illustrated in FIGS. 7A and 7B. In some examples, cylindrical lens 870 can be a skewed or asymmetric cylindrical lens (e.g., also referred to herein as "skewed cylindrical lens 870") and may be the same as or similar to the second skewed cylindrical lens 770 illustrated in FIGS. 7A and 7B.

In some cases, each cylindrical lens 850, 860, 870 can have a first surface and a second surface opposite to the first surface. In some examples, the first surface can be a curved surface and the second surface can be a flat or non-curved surface. For example, the first surface can correspond to a convex surface and the second surface can correspond to a planar surface. In some aspects, the cylindrical lenses 850, 860, 870 can each include a power direction 822 corresponding to a curvature of the first surface (e.g., curvature of convex surface). In some examples, the cylindrical lenses 850, 860, 870 can have optical power in power direction 822. In some aspects, power direction 822 may be orthogonal to a non-power direction 820.

In some examples, the beamforming device may include a plurality of linear antenna arrays disposed proximate to the respective planar surfaces of the cylindrical lenses 850, 860, and 870. For example, linear antenna array 808, linear antenna array 812, and linear antenna array 816 may be disposed (e.g., placed, arranged, etc.) proximate to the planar surfaces 851, 861, and 871, respectively, of first skewed cylindrical lens 850, non-skewed cylindrical lens 860, and second skewed cylindrical lens 870.

In some examples, the distance between the linear antenna arrays (e.g., linear antenna array 808, linear antenna array 812, and linear antenna array 816) and the planar surfaces 851, 861, and 871 of the respective cylindrical lenses 850, 860, and 870, may correspond to a back focal length of the cylindrical lenses. In one non-limiting example, the distance between the linear antenna arrays 808, 812, 816 and the respective planar surfaces 851, 861, 871 may be approximately 2 millimeters (mm). In some aspects, the linear antenna arrays 808, 812, 816 can be positioned such that a radio frequency (RF) beam is collimated along power direction 822 (e.g., perpendicular to a direction of the linear antenna arrays). For example, the linear antenna arrays can include a plurality of linear antenna array elements that are aligned along the non-power direction 820. In some aspects, the linear antenna arrays 808, 812, 816 can be aligned parallel to one another and/or the plurality of linear antenna array elements included in a given linear antenna array can be aligned parallel to the plurality of linear antenna array elements included in the other linear antenna arrays.

In some cases, each linear antenna array of the plurality of linear antenna arrays can include a plurality of antenna array elements. For instance, linear antenna array 808, linear antenna array 812, and linear antenna array 816 can each include multiple antenna elements. In some examples, linear antenna array 808 can include antenna element 810*a*, antenna element 810*b*, antenna element 810*c*, antenna element 810*d*, antenna element 810*e*, antenna element 810*f*, antenna element 810*g*, and antenna element 810*h* (collectively referred to as "antenna elements 810"). In some cases, linear antenna array 812 can include antenna element 814*a*, antenna element 814*b*, antenna element 814*c*, antenna element 814*d*, antenna element 814*e*, antenna element 814*f*, antenna element 814*g*, and antenna element 814*h* (collectively referred to as "antenna elements 814"). In some configurations, linear antenna array 816 can include antenna element 818*a*, antenna element 818*b*, antenna element 818*c*, antenna element 818*d*, antenna element 818*e*, antenna element 818*f*, antenna element 818*g*, and antenna element 818*h* (collectively referred to as "antenna elements 818"). Although FIG. 8 is illustrated as having three linear antenna arrays with eight antenna elements, those skilled in the art will recognize that the present technology is not limited to a particular number of linear antenna arrays and/or a particular number of antenna elements. For example, three linear antenna arrays with four antenna elements per array may also be utilized.

In some examples, the plurality of antenna array elements for each of the plurality of linear antenna arrays can be aligned in a direction that is perpendicular to the power direction. For example, antenna elements 810*a-h*, antenna elements 814*a-h*, and antenna elements 818*a-h* can each be aligned in a direction that is perpendicular to power direction 822 (e.g., parallel to non-power direction 820). In some aspects, each linear antenna array (e.g., linear antenna array 808, linear antenna array 812, and linear antenna array 816) can be configured to steer an RF beam along different portions of power direction 822.

For example, linear antenna array 812 and the associated non-skewed cylindrical lens 860 can be used to steer an RF beam along the center of power direction 822. In some examples, the selection of a particular one of the antenna elements 814*a*-814*h* can be used to steer an RF beam along an elevation direction, with each of the antenna elements 814*a*-814*h* steering the RF beam in a different elevation direction and a same azimuth direction.

In another example, linear antenna array 808 and linear antenna array 816 can be used to steer RF beams at different angles (e.g., different azimuthal angles) along power direction 822 (e.g., as further illustrated and described herein with respect to FIG. 8). For example, linear antenna array 808 and the associated first skewed cylindrical lens 850 can be used to steer an RF beam along a first beam angle that is different than power direction 822. In some aspects, the first beam angle associated with linear antenna array 808 and first skewed cylindrical lens 850 can be based at least in part on the asymmetric curvature of the first surface (e.g., convex surface) of first skewed cylindrical lens 850.

In some examples, linear antenna array 816 and the associated second skewed cylindrical lens 870 can be used to steer an RF beam along a second beam angle that is different than power direction 822. In one illustrative example, the second beam angle can be different than power direction 822 and can be different than the first beam angle (e.g., the beam angle associated with the linear antenna array 808 and first skewed cylindrical lens 850). In some aspects, the second beam angle associated with linear antenna array 816 and second skewed cylindrical lens 870 can be based at least in part on the asymmetric curvature of the first surface (e.g., convex surface) of second skewed cylindrical lens 870.

In some cases, each linear antenna array (e.g., linear antenna array 808, linear antenna array 812, and linear antenna array 816) can be used to steer an RF beam along different portions of non-power direction 820. For example, each of the linear antenna arrays can be configured as a phased array antenna in which each of the corresponding antenna elements are configured to transmit or receive a phase shifted RF signal. In one illustrative example, a phase difference between each of the antenna elements 814 corresponding to linear antenna array 812 can be used to steer an RF beam (e.g., radiation pattern) in different directions along the non-power direction 820. In some aspects, phasing of antenna elements 814 can steer the RF beam at different angles relative to the non-power direction 820 while maintaining the RF beam at the azimuthal direction (e.g., beam angle relative to power direction 822) based on the curvature of the associated cylindrical lens element.

In some examples, the distance 824 between one or more linear antenna arrays can be less than or equal to a wavelength of an RF signal. For example, an RF signal having a frequency of 150 GHz can have a wavelength that is approximately 2 millimeters (mm). In one illustrative example, the distance 824 between linear antenna array 812 and linear antenna array 816 can be approximately 1.75 mm. In some cases, an array pitch 826 (e.g., distance between antenna elements) can be approximately half of the wavelength of an RF signal. For example, array pitch 826 can be approximately 1 mm when the wavelength is 2 mm.

In some examples, the distance 824 between linear arrays can be approximately 2.33 mm. In some cases, a focal length (e.g., distance between each linear array 808, 812, 816 and the respective planar surface 851, 861, 871 of the associated cylindrical lens 850, 860, 870) can be approximately 2.33 mm. In some examples, a width of one or more (or all) of the cylindrical lenses 850, 860, 870 (e.g., a width in the power direction 822) can be approximately 2.33 mm.

Figure 9:
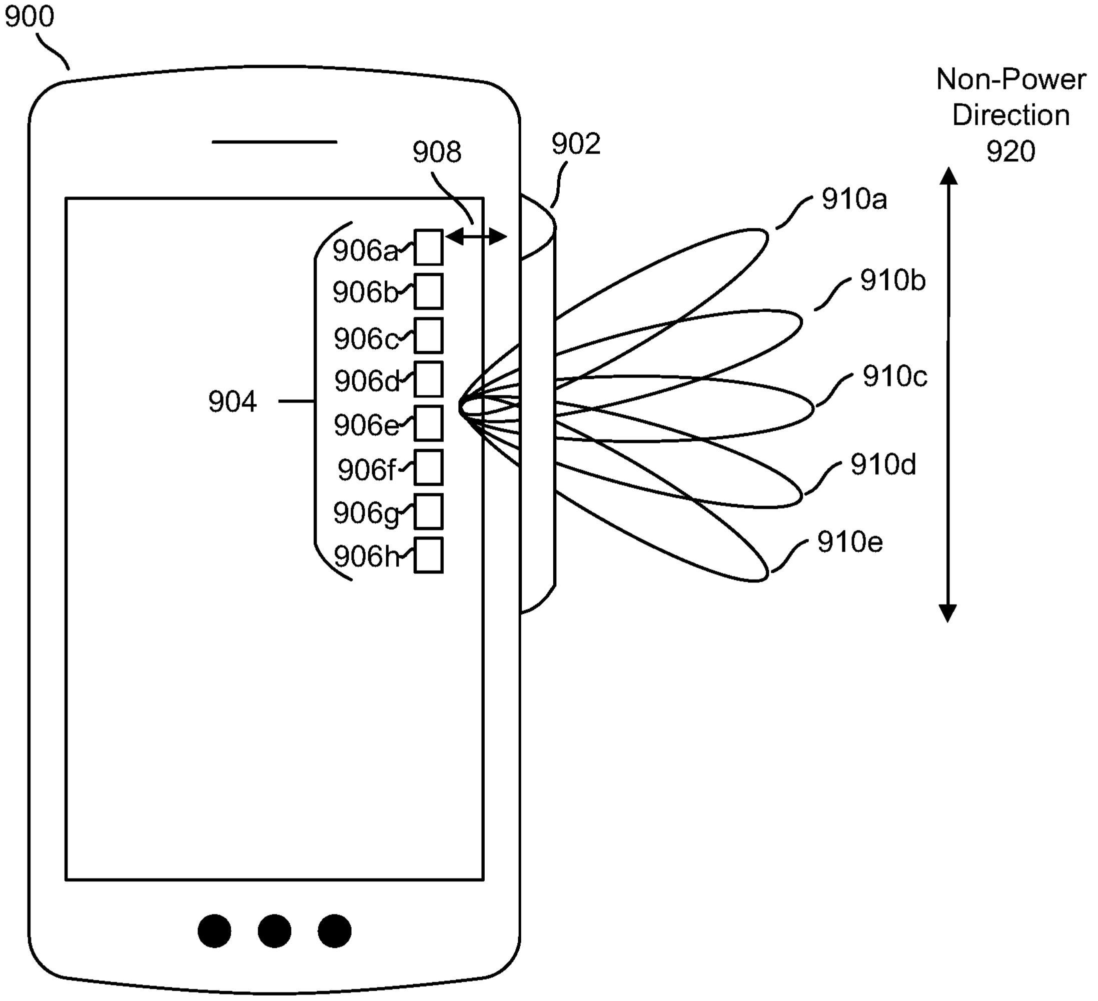
FIG. 9 is a diagram illustrating an example of a user equipment (UE) having a beamforming device with a cylindrical lens array that includes a plurality of cylindrical lenses, in accordance with some examples.

FIG. 9 illustrates a frontal view of a user equipment (UE) 900 that includes a beamforming device with a plurality of cylindrical lenses. In some aspects, UE 900 can include a cylindrical lens array 902, which can be the same as or similar to the lens array 700 illustrated in FIG. 7A, the lens array 700*b* illustrated in FIG. 7B, and/or the lens array 800 illustrated in FIG. 8. In some examples, cylindrical lens array 902 can include the skewed cylindrical lens 750, the non-skewed (e.g., differently skewed) cylindrical lens 760, and the skewed cylindrical lens 770 illustrated in FIGS. 7A and 7B. In some examples, cylindrical lens array 902 can include the skewed cylindrical lens 850, the non-skewed cylindrical lens 860, and the skewed cylindrical lens 870 illustrated in FIG. 8. In some cases, one or more cylindrical lenses included in cylindrical lens array 902 may correspond to a plano convex lens (e.g., such as the non-skewed cylindrical lens 500 illustrated in FIG. 5). In some examples, cylindrical lens array 902 may be mounted along a side or edge of UE 900. In some cases, cylindrical lens array 902 can be mounted on UE 900 such that cylindrical lens array 902 is flush with or level to a side or edge of UE 900. In another example, cylindrical lens array 902 can be mounted on UE 900 such that cylindrical lens array 902 is recessed relative to a side or edge of UE 900. In another example, cylindrical lens array 902 can be mounted on UE 900 such that cylindrical lens array 902 protrudes from UE 900. In some cases, the width of cylindrical lens array 902 can be less than or equal to a thickness of UE 900.

In some aspects, UE 900 can include one or more linear antenna arrays such as linear antenna array 904. In some cases, UE 900 can include additional linear antenna arrays (not illustrated) that can be arranged in a direction that is substantially parallel to linear antenna array 904. In some examples, linear antenna array 904 can include multiple antenna array elements such as antenna element 906*a*, antenna element 906*b*, antenna element 906*c*, antenna element 906*d*, antenna element 906*e*, antenna element 906*f*, antenna element 906*g*, and antenna element 906*h* (collectively referred to as "antenna elements 906").

In some examples, antenna elements 906*a-h* can be positioned behind cylindrical lens array 902. For example, antenna elements 906*a-h* can be arranged behind a planar surface (e.g., one of the planar surfaces 851, 861, and 871) of one of the cylindrical lenses (e.g., skewed cylindrical lens 850, non-skewed cylindrical lens 860, and skewed cylindrical lens 870, respectively) included in the cylindrical lens array 902. In some cases, the distance 908 between antenna elements 906*a-h* and cylindrical lens array 902 can be based on a back focal length of cylindrical lens array 902.

In some aspects, each linear antenna array can be configured to steer at least on RF beam along the non-power direction of the cylindrical lens array 902. For example, linear antenna array 904 can be configured to steer one or more RF beams (e.g., RF beam 910*a*, RF beam 910*b*, RF beam 910*c*, RF beam 910*c*, RF beam 910*d*, and/or RF beam 910*e*) along non-power direction 920 of cylindrical lens array 902. In some examples, linear antenna array 904 can be configured as a phased antenna array such that antenna elements 906*a-h* are configured to transmit or receive a phase shifted RF signal. In one illustrative example, a phase difference between each of the antenna elements 906*a-h* corresponding to linear antenna array 904 can be used to steer RF beam 910*c* in a direction that is perpendicular to linear antenna array 904. In another example, phase differences between each of the antenna elements 906*a-h* corresponding to linear antenna array 904 can be used to steer an RF beam in one or more directions along the non-power direction 920 (e.g., directions corresponding to RF beam 910*a*, RF beam 910*b*, RF beam 910*d*, and/or RF beam 910*e*).

Figure 10A:
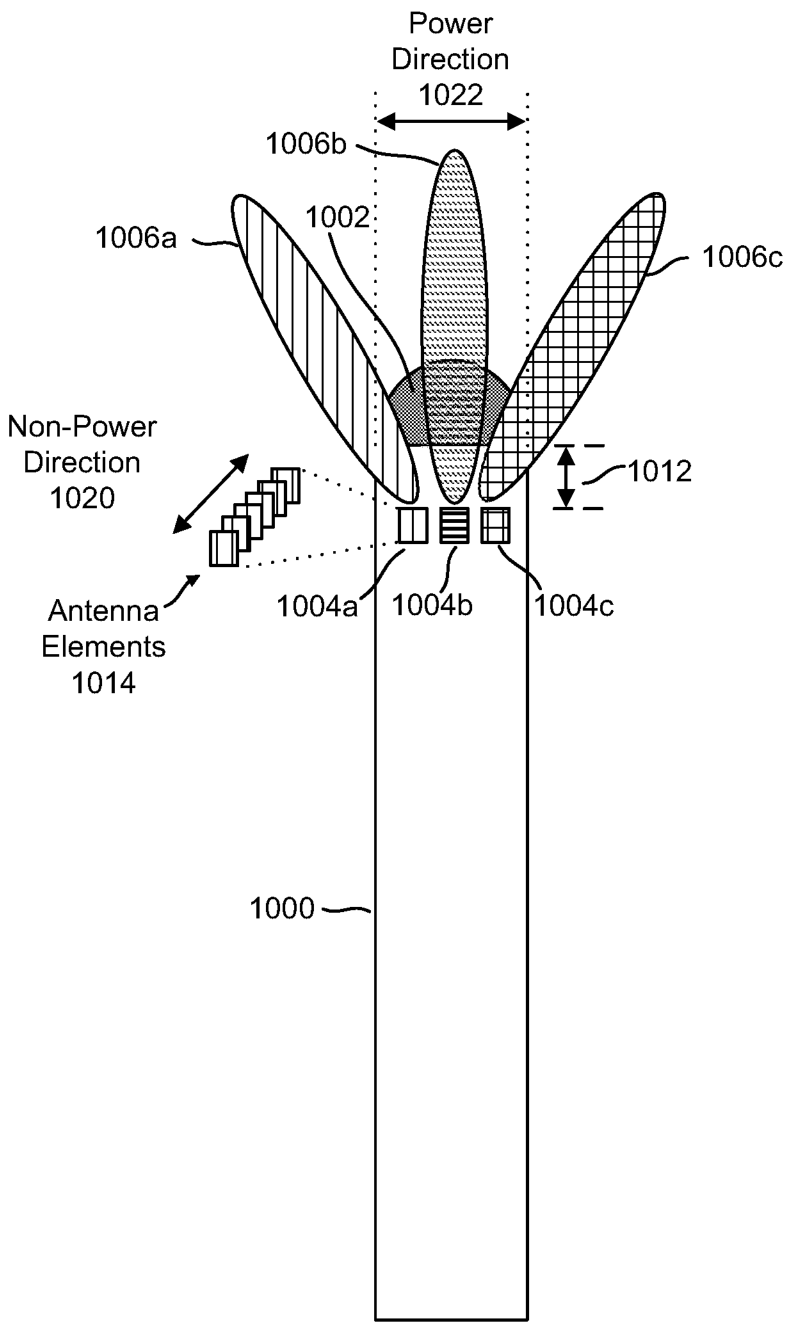
FIG. 10A is a diagram illustrating another example of a UE having a beamforming device with a cylindrical lens array that includes a plurality of cylindrical lenses, in accordance with some examples.

FIG. 10A illustrates a side view of a user equipment (UE) 1000 that includes a beamforming device with a plurality of cylindrical lenses. In some aspects, UE 1000 can include a cylindrical lens array 1002, which can be the same as or similar to the lens array 700 illustrated in FIG. 7A, the lens array 700*b* illustrated in FIG. 7B, and/or the lens array 800 illustrated in FIG. 8. In some examples, cylindrical lens array 1002 can include the skewed cylindrical lens 750, the non-skewed (e.g., differently skewed) cylindrical lens 760, and the skewed cylindrical lens 770 illustrated in FIGS. 7A and 7B. In some examples, cylindrical lens array 1002 can include the skewed cylindrical lens 850, the non-skewed cylindrical lens 860, and the skewed cylindrical lens 870 illustrated in FIG. 8. In some cases, one or more cylindrical lenses included in cylindrical lens array 1002 may correspond to a plano convex lens (e.g., such as the non-skewed cylindrical lens 500 illustrated in FIG. 5).

As illustrated, cylindrical lens array 1002 is mounted along atop surface of UE 1000. However, those skilled in the art will recognize that cylindrical lens array 1002 can be positioned at any other suitable location relative to UE 1000 for transmitting and receiving RF signals (e.g., bottom, side, front, back, etc.). In some aspects, UE 1000 can include one or more linear antenna arrays such as linear antenna array 1004*a*, linear antenna array 1004*b*, and linear antenna array 1004*c*. In some examples, each linear antenna array can include multiple antenna elements. For instance, linear antenna array 1004*a* can include antenna elements 1014. In some aspects, linear antenna array 1004*b* and linear antenna array 1004*c* may also include a series of antenna elements (not illustrated) that can be arranged in a direction that is substantially parallel to antenna elements 1014. In some configurations, each linear antenna array may steer an RF beam along non-power direction 1020 using phase shifting among the respective antenna elements (e.g., antenna elements 1014).

In some examples, an RF beam can be steered along power direction 1022 of cylindrical lens array 1002 based on the selection of a linear antenna array (e.g., and the skewed or non-skewed cylindrical lens associated with each linear antenna array). For example, selection of linear antenna array 1004*a* (e.g., associated with the first skewed cylindrical lens 750 illustrated in FIGS. 7A and 7B, and/or associated with the first skewed cylindrical lens 850, illustrated in FIG. 8) can be used to steer an RF beam in a direction along power direction 1022 corresponding to RF beam 1006*a*. In some examples, RF beam 1006*a* can be the same as the steered beam 754 illustrated in FIGS. 7A and 7B.

In another example, selection of linear antenna array 1004*b* (e.g., associated with the non-skewed (e.g., differently skewed) cylindrical lens 760 illustrated in FIGS. 7A and 7B, and/or associated with the non-skewed cylindrical lens 860, illustrated in FIG. 8) can be used to steer an RF beam in a direction along power direction 1022 corresponding to RF beam 1006*b*. In some examples, RF beam 1006*b* can be the same as the steered beam 764 illustrated in FIGS. 7A and 7B.

In another example, selection of linear antenna array 1004*c* (e.g., associated with the second skewed cylindrical lens 770 illustrated in FIGS. 7A and 7B, and/or associated with the second skewed cylindrical lens 870, illustrated in FIG. 8) can be used to steer an RF beam in a direction along power direction 1022 corresponding to RF beam 1006*c*. In some examples, RF beam 1006*c* can be the same as the steered beam 774 illustrated in FIGS. 7A and 7B.

In some cases, each linear antenna array can be associated with a corresponding beam angle that is based on a curvature of the curved (e.g., convex) surface of the associated cylindrical lens element with which each linear antenna array is associated. For example, linear antenna array 1004*a* can be associated with the first skewed cylindrical lens 750 or 850 (e.g., illustrated in FIGS. 7 and 8, respectively), which has an asymmetrical curvature such that an optical axis of the skewed cylindrical lens is offset to the left of a central axis of the skewed cylindrical lens. The beam angle associated with linear antenna array 1004*a* (e.g., the beam angle of RF beam 1006*a*) can be based on the offset between the optical axis and central axis of the first skewed cylindrical lens 750 or 850.

In another example, linear antenna array 1004*b* can be associated with the non-skewed cylindrical lens 760 or 860 (e.g., illustrated in FIGS. 7 and 8, respectively), which has a symmetrical curvature such that an optical axis of the non-skewed cylindrical lens and a central axis of the non-skewed cylindrical lens are the same. The beam angle associated with linear antenna array 1004*b* (e.g., the beam angle of RF beam 1006*b*) can be aligned with the optical axis and central axis of the non-skewed cylindrical lens 760 or 860.

In another example, linear antenna array 1004*c* can be associated with the second skewed cylindrical lens 770 or 870 (e.g., illustrated in FIGS. 7 and 8, respectively), which has an asymmetrical curvature such that an optical axis of the skewed cylindrical lens is offset to the right of a central axis of the skewed cylindrical lens. The beam angle associated with linear antenna array 1004*c* (e.g., the beam angle of RF beam 1006*c*) can be based on the offset between the optical axis and central axis of the second skewed cylindrical lens 750 or 850.

In some aspects, each linear antenna array can be associated with a corresponding beam angle that is based on a position of each linear antenna array relative to a surface of a corresponding cylindrical lens (e.g., skewed or non-skewed) included in the cylindrical lens array 1002. For example, each linear antenna array can be configured to direct an RF beam along power direction 1022 based on the position of the linear antenna array relative to a surface (e.g., planar surfaces 851, 861, 871 or the respective opposite curved surfaces) of the corresponding cylindrical lens included in the cylindrical lens array 1002. In one illustrative example, linear antenna array 1004*b* can be positioned behind the center of a non-skewed cylindrical lens (e.g., such as the non-skewed (e.g., differently skewed) cylindrical lens 760 illustrated in FIGS. 7A and 7B and/or the non-skewed (e.g., differently skewed) cylindrical lens 860 illustrated in FIG. 8) included in the cylindrical lens array 1002 and can be configured to direct RF beam 1006*b* at a 90-degree angle that can coincide with a center of power direction 1022.

In some examples, the distance 1012 between the linear antenna arrays (e.g., linear antenna array 1004*a*, linear antenna array 1004*b*, and linear antenna array 1004*c*) and the cylindrical lens array 1002 can be based on a back focal length of cylindrical lens array 1002. In some cases, the linear antenna arrays can be positioned such that the respective RF beam (e.g., RF beam 1006*a*, RF beam 1006*b*, and RF beam 1006*c*) is collimated along power direction 1022 of cylindrical lens array 1002.

Figure 10B:
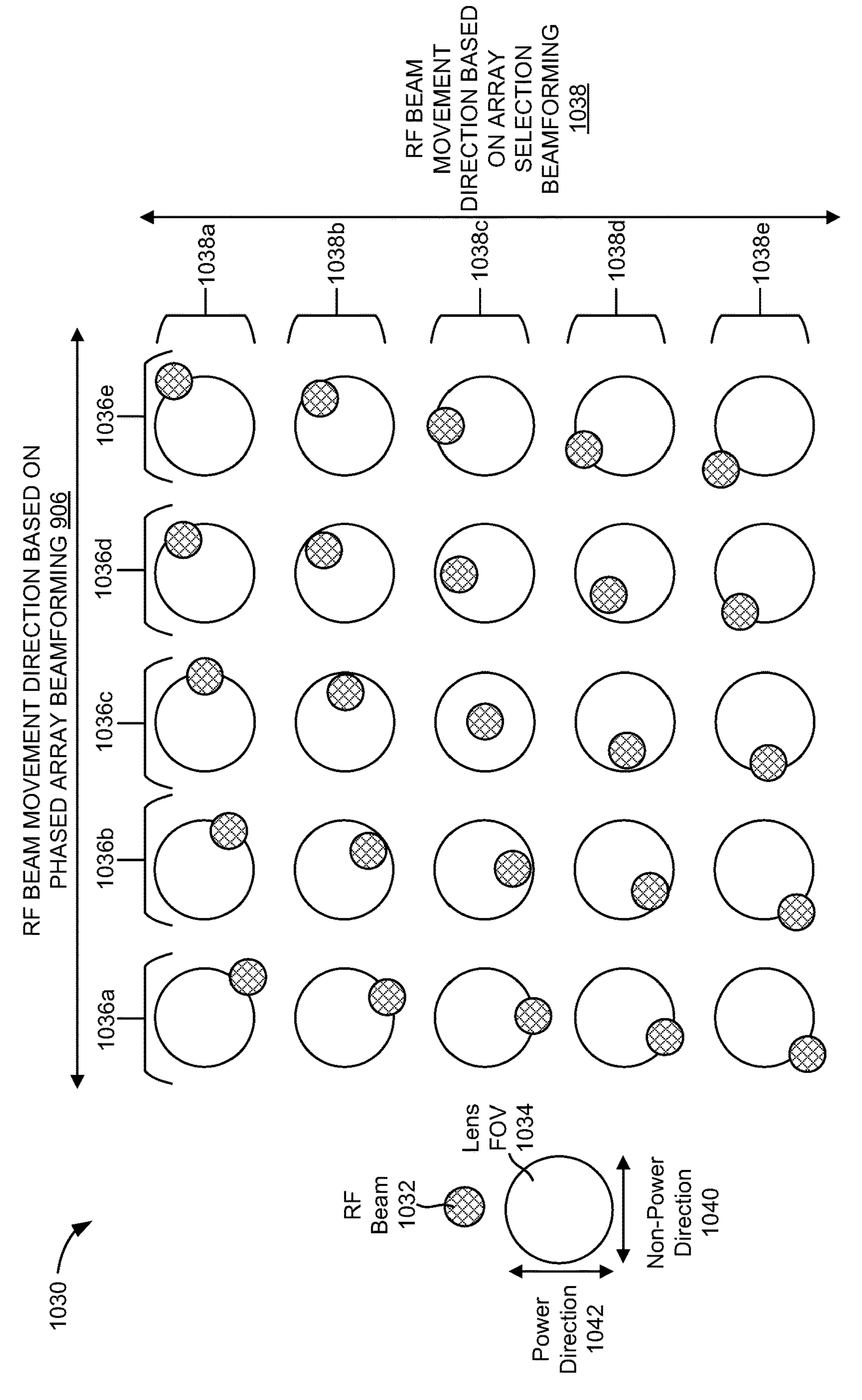
FIG. 10B is a diagram illustrating examples of beam steering directions, in accordance with some examples.

FIG. 10B is a diagram illustrating examples of beam steering directions 1030 for RF beam 1032 relative to lens field of view (FOV) 1034. As noted above, a phased linear antenna array can be used to steer an RF beam along a non-power direction 1040 of a cylindrical lens and selection of a linear antenna array can be used to steer an RF beam along the power direction 1042 of a cylindrical lens. In some aspects, the overall direction of an RF beam can be based the linear antenna array selected for beamforming (e.g., array selection beamforming) and the phasing of the antenna elements within the selected linear antenna array (e.g., phased array beamforming).

For example, as illustrated in FIG. 10B, movement of the RF beam 1032 in a direction 1038 corresponding to the power direction 1042 (e.g., movement of the RF beam 1032 from (1036*a*, 1038*a*) to (1036*b*, 1038*a*)) can be based on the selection of a different linear array using array selection beamforming. For instance, selection of a different antenna array can shift the RF beam 1032 in the direction 1038.

Similarly, movement of the RF beam 1032 in a direction 1036 corresponding to the non-power direction 1040 (e.g., movement of the RF beam 1032 from (1036*a*, 1038*a*) to (1036*a*, 1038*b*)) can be based on phased array beamforming (e.g., using a same antenna array with different antenna phasing). For example, phased array beamforming can shift the RF beam 1032 in the direction 1036.

In one example, the direction of RF beam 1032 can be located substantially at the center of lens FOV 1034 when array selection beamforming corresponds to linear antenna array 1036*c* and phased array beamforming corresponds to antenna phasing 1038*c*. In another example, the direction of RF beam 1032 can be steered away from the center of lens FOV 1034 downward along power direction 1042 by maintaining antenna phasing 1038*c* and selecting linear antenna array 1036*b* or linear antenna array 1036*a*. In another example, the direction of RF beam 1032 can be steered away from the center of lens FOV 1034 toward the right along the non-power direction 1040 by continuing to use linear antenna array 1036*c* while using antenna phasing 1038*b* or antenna phasing 1038*a*. Similar operations can be performed when using linear antenna array 1036*d* or linear antenna array 1036*e*.

Figure 11:
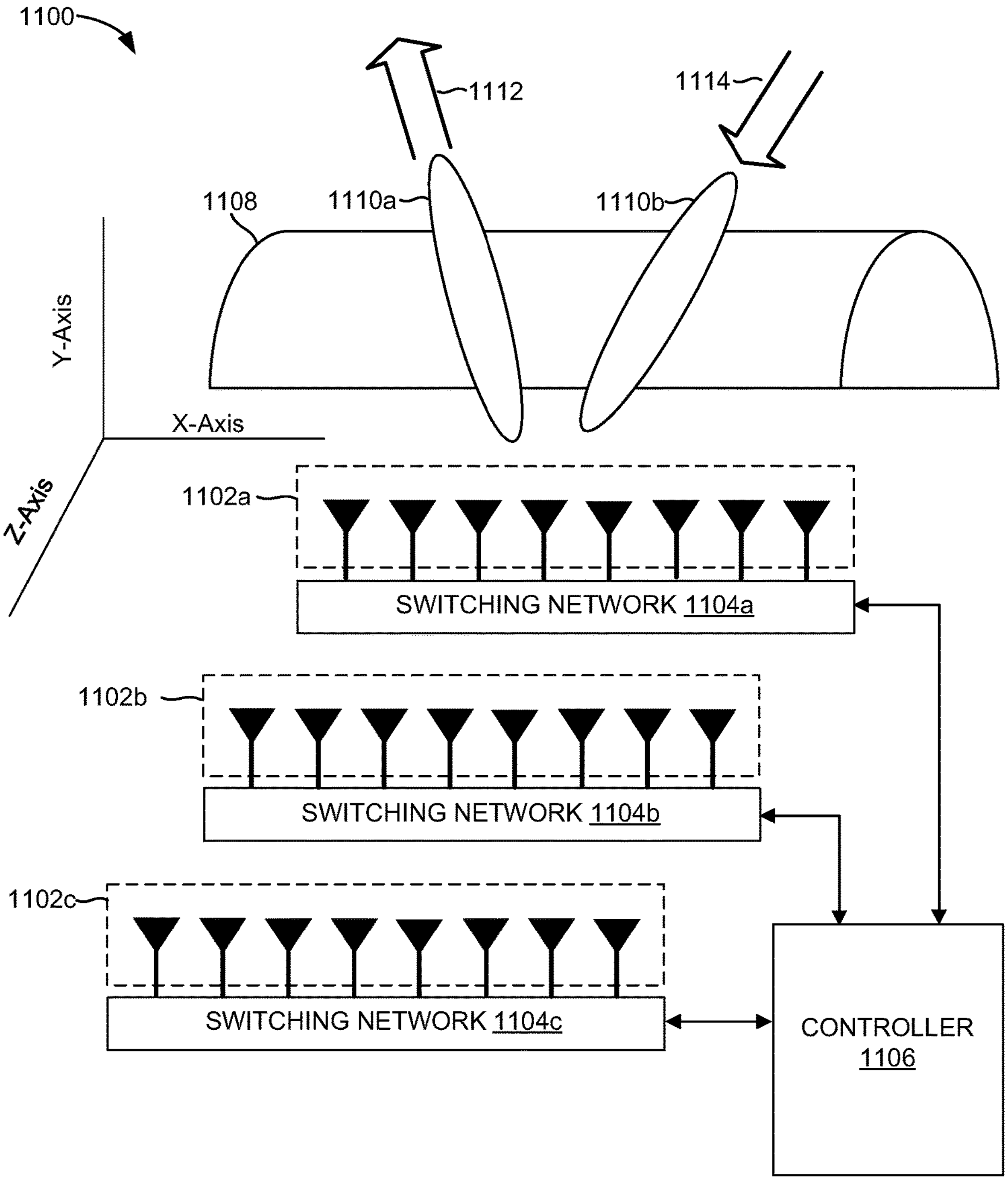
FIG. 11 is a diagram illustrating further portions of a beamforming device with a cylindrical lens array that includes a plurality of cylindrical lenses, in accordance with some examples.

FIG. 11 is a diagram illustrating portions of a beamforming device 1100 with a cylindrical lens array, in accordance with some examples. In some aspects, beamforming device 1100 can include one or more linear antenna arrays such as linear antenna array 1102*a*, linear antenna array 1102*b*, and linear antenna array 1102*c*. In some cases, each linear antenna array can be positioned to direct a respective RF beam along a different angle corresponding to a power direction of a cylindrical lens array 1108. In some examples, the cylindrical lens array 1108 can include a plurality of cylindrical lenses (e.g., at least one skewed cylindrical lens and at least one non-skewed cylindrical lens). For example, cylindrical lens array 1108 can be the same as or similar to the lens array 700 illustrated in FIG. 7A, the lens array 700*b* illustrated in FIG. 7B, and/or the lens array 800 illustrated in FIG. 8. In some examples, cylindrical lens array 1108 can include the skewed cylindrical lens 750, the non-skewed (e.g., differently skewed) cylindrical lens 760, and the skewed cylindrical lens 770 illustrated in FIGS. 7A and 7B. In some examples, the cylindrical lens array 1108 can include the skewed cylindrical lens 850, the non-skewed cylindrical lens 860, and the skewed cylindrical lens 870 illustrated in FIG. 8. In some aspects, the cylindrical lens array 1108 can be the same as or similar to one or more of the cylindrical lens array 902 illustrated in FIG. 9 and/or the cylindrical lens array 1002 illustrated in FIG. 10A.

In some examples, each linear antenna array can include multiple antenna elements that can be configured to perform phased array beamforming in order to direct an RF beam along a non-power direction of cylindrical lens array 1108. For example, linear antenna array 1102*a*, linear antenna array 1102*b*, and/or linear antenna array 1102*c* may be configured to direct RF beam 1110*a* through a respective one of the cylindrical lenses (e.g., either a skewed cylindrical lens or a non-skewed cylindrical lens) included in the cylindrical lens array 1108 to transmit output signal 1112. In another example, linear antenna array 1102*a*, linear antenna array 1102*b*, and/or linear antenna array 1102*c* can be configured to direct RF beam 1110*b* through a respective one of the cylindrical lenses (e.g., either a skewed cylindrical lens or a non-skewed cylindrical lens) included in the cylindrical lens array 1108 to receive input signal 1114.

In some aspects, each linear antenna array can be coupled to a respective switching network that can be used by controller 1106 to independently address and/or control each linear antenna array. For example, linear antenna array 1102*a* can be coupled to switching network 1104*a*, linear antenna array 1102*b* can be coupled to switching network 1104*b*, and linear antenna array 1102*c* can be coupled to switching network 1104*c*.

In some configurations, each switching network provides a connection to controller 1106 for each respective linear antenna array. In some examples, controller 1106 can separately address and control each linear antenna array (e.g., via a respective switching network). In some aspects, controller 1106 may configure each linear antenna array to independently stream data (e.g., transmit or receive an RF signal) and/or to independently direct an RF beam to a particular direction. For example, controller 1106 can configure linear antenna array 1102*a* to direct an RF beam in a first direction and simultaneously configure linear antenna array 1102*b* to direct an RF beam in a second direction that is different from the first direction. In some cases, controller 1106 may configure multiple linear antenna arrays to direct beams in a same direction. For instance, linear antenna array 1102*b* and linear antenna array 1102*c* may both be configured to receive input signal 1114 using RF beam 1110*b*. In some aspects, the controller 1106 can control two or more arrays (e.g., linear antenna array 1102*a* and linear antenna array 1102*b*) to direct two or more beams in a same direction along the non-power direction (e.g., elevation direction) of the respective (e.g., corresponding) cylindrical lens (skewed or non-skewed) associated with the linear antenna array and include cylindrical lens array 1108, resulting in a superposition of elevation beams.

Figure 12:
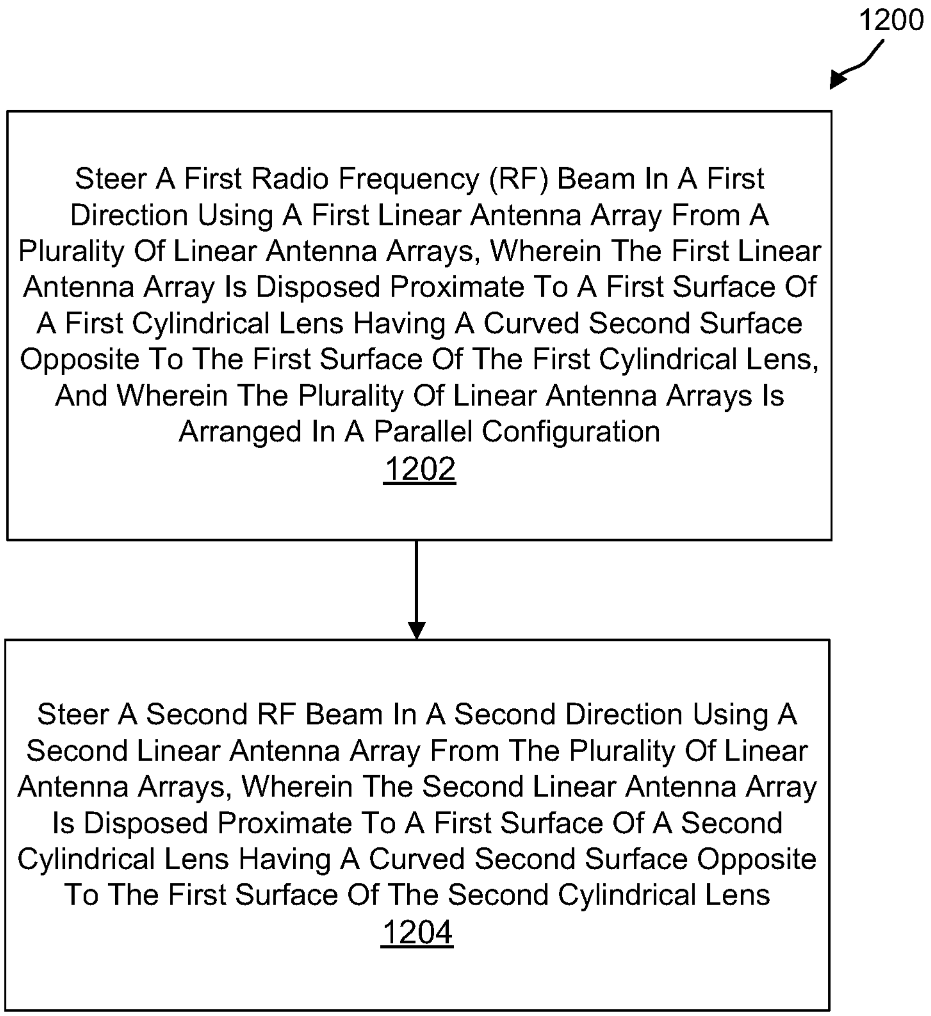
FIG. 12 is a flow diagram illustrating an example of a process for performing radio frequency (RF) beamforming, in accordance with some examples.

FIG. 12 is a flow diagram illustrating an example of a process 1200 for performing wireless communications. In some aspects, the process 1200 may be performed by, for example, a user equipment (UE) such as UE 104. Although the example process 1200 depicts a particular sequence of operations, the sequence may be altered without departing from the scope of the present disclosure. For example, some of the operations depicted may be performed in parallel or in a different sequence that does not materially affect the function of the process 1200. In other examples, different components of an example device or system that implements the process 1200 may perform functions at substantially the same time or in a specific sequence.

At block 1202, the process 1200 includes steering a first radio frequency (RF) beam in a first direction using a first linear antenna array from a plurality of linear antenna arrays, wherein the first linear antenna array is disposed proximate to a first surface of a first cylindrical lens having a curved second surface opposite to the first surface of the first cylindrical lens, and wherein the plurality of linear antenna arrays is arranged in a parallel configuration.

For example, the first cylindrical lens can be a skewed cylindrical lens. In some examples, the first cylindrical lens can be a skewed cylindrical lens the same as or similar to one or more of the skewed cylindrical lenses 750 and/or 770 illustrated in FIGS. 7A and 7B and/or the skewed cylindrical lenses 850 and 870 illustrated in FIG. 8. The first linear antenna array can be included in a plurality of parallel linear antenna arrays, wherein each linear antenna array of the plurality of linear antenna arrays is disposed proximate to a flat planar surface of each respective cylindrical lens. In some examples, the curved second surface of the first cylindrical lens can be a convex curved surface or a concave curved surface.

In some examples, steering the first RF beam in the first direction is based on a first optical axis offset associated with the first cylindrical lens. For example, when the first cylindrical lens is a first skewed cylindrical lens, the first optical axis offset can be an offset between a central axis of the first skewed cylindrical lens and an optical axis of the first skewed cylindrical lens, wherein the offset is based on an amount of skew associated with the first skewed cylindrical lens and/or an asymmetry of the curvature of the curved second surface of the first skewed cylindrical lens. For example, steering the first RF beam in the first direction can be based on the offset between central axis 753 and optical axis 755 as illustrated in FIG. 7A for first skewed cylindrical lens 750.

In some aspects, steering the first RF beam in the first direction using the first linear antenna array is based on a first beam angle associated with the first linear antenna array and the first skewed cylindrical lens. For example, the first beam angle can be based on the offset between central axis 753 and optical axis 755 as illustrated in FIG. 7A for first skewed cylindrical lens 750. In some examples, the first beam angle can be further based on a curvature of the curved second surface of the first skewed cylindrical lens and/or a thickness (e.g., orthogonal to power direction 722, illustrated in FIG. 7A) of the first skewed cylindrical lens.

At block 1204, the process 1200 includes steering a second RF beam in a second direction using a second linear antenna array from the plurality of linear antenna arrays, wherein the second linear antenna array is disposed proximate to a first surface of a second cylindrical lens having a curved second surface opposite to the first surface of the second cylindrical lens.

In some examples, the first direction is different than the second direction. For example, the first direction and the second direction can be different azimuthal directions associated with or relative to a lens array that includes the first cylindrical lens and the second cylindrical lens. In some aspects, the first cylindrical lens is a first skewed cylindrical lens (e.g., as described above) and the second cylindrical lens is a differently skewed cylindrical lens, wherein the differently skewed cylindrical lens has a different skew than the first skewed cylindrical lens.

For example, the second cylindrical lens can be a non-skewed cylindrical lens. In some examples, the first cylindrical lens can be a non-skewed cylindrical lens the same as or similar to one or more of the non-skewed cylindrical lenses 500 illustrated in FIG. 5, 600*a* illustrated in FIG. 6A, 600*b* illustrated in FIG. 6B, 760 illustrated in FIGS. 7A and 7B, and/or 860 illustrated in FIG. 8. The second linear antenna array can be included in a plurality of parallel linear antenna arrays, wherein each linear antenna array of the plurality of linear antenna arrays is disposed proximate to a flat planar surface of each respective cylindrical lens. In some examples, the curved second surface of the second cylindrical lens can be a convex curved surface or a concave curved surface. In some examples, the curvature of the curved second surface of the differently skewed cylindrical lens can be different than the curvature of the curved second surface of the first skewed cylindrical lens.

In some examples, steering the second RF beam in the second direction is based on a second optical axis offset associated with the second cylindrical lens (e.g., the differently skewed cylindrical lens). For example, when the second cylindrical lens is a differently skewed cylindrical lens, the second optical axis offset can be an offset between a central axis of the differently skewed cylindrical lens and an optical axis of the differently skewed cylindrical lens, wherein the offset is based on an amount of skew associated with the different skewed cylindrical lens and/or an asymmetry of the curvature of the curved second surface of the differently skewed cylindrical lens.

In some examples, when the differently skewed cylindrical lens is anon-skewed cylindrical lens, the second optical axis offset can be zero (e.g., the central axis of the differently skewed cylindrical lens can be the same as the optical axis of the differently skewed cylindrical lens). For example, the differently skewed cylindrical lens can be the same as or similar to the non-skewed cylindrical lens 760 illustrated in FIGS. 7A and 7B, wherein the offset between the central axis and the optical axis of non-skewed cylindrical lens 760 is 0 (e.g., based on the central axis and the optical axis 765 being the same). In some aspects, the second optical axis offset (e.g., associated with the differently skewed cylindrical lens) can be different than the first optical axis offset (e.g., associated with the first skewed cylindrical lens).

In some aspects, steering the second RF beam in the second direction using the second linear antenna array is based on a second beam angle associated with the second linear antenna array and the differently cylindrical lens. In some aspects, the second beam angle is different than the first beam angle. For example, the second beam angle can be based on the zero offset between the central axis and optical axis 765 as illustrated in FIG. 7A for the non-skewed (e.g., differently skewed) cylindrical lens 760. In some examples, the second beam angle can be further based on a curvature of the curved second surface of the non-skewed (e.g., differently skewed) cylindrical lens and/or a thickness (e.g., orthogonal to power direction 722, illustrated in FIG. 7A) of the non-skewed (e.g., differently skewed) cylindrical lens.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

In some examples, the processes described herein (e.g., process 1200 and/or other process described herein) may be performed by a computing device or apparatus (e.g., a UE or a base station). In one example, the process 1200 can be performed by the user equipment 104 of FIG. 2 and/or the wireless device 407 of FIG. 4. In another example, the process 1200 may be performed by a computing device with the computing system 1300 shown in FIG. 13.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, neural processing units (NPUs), graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1200 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
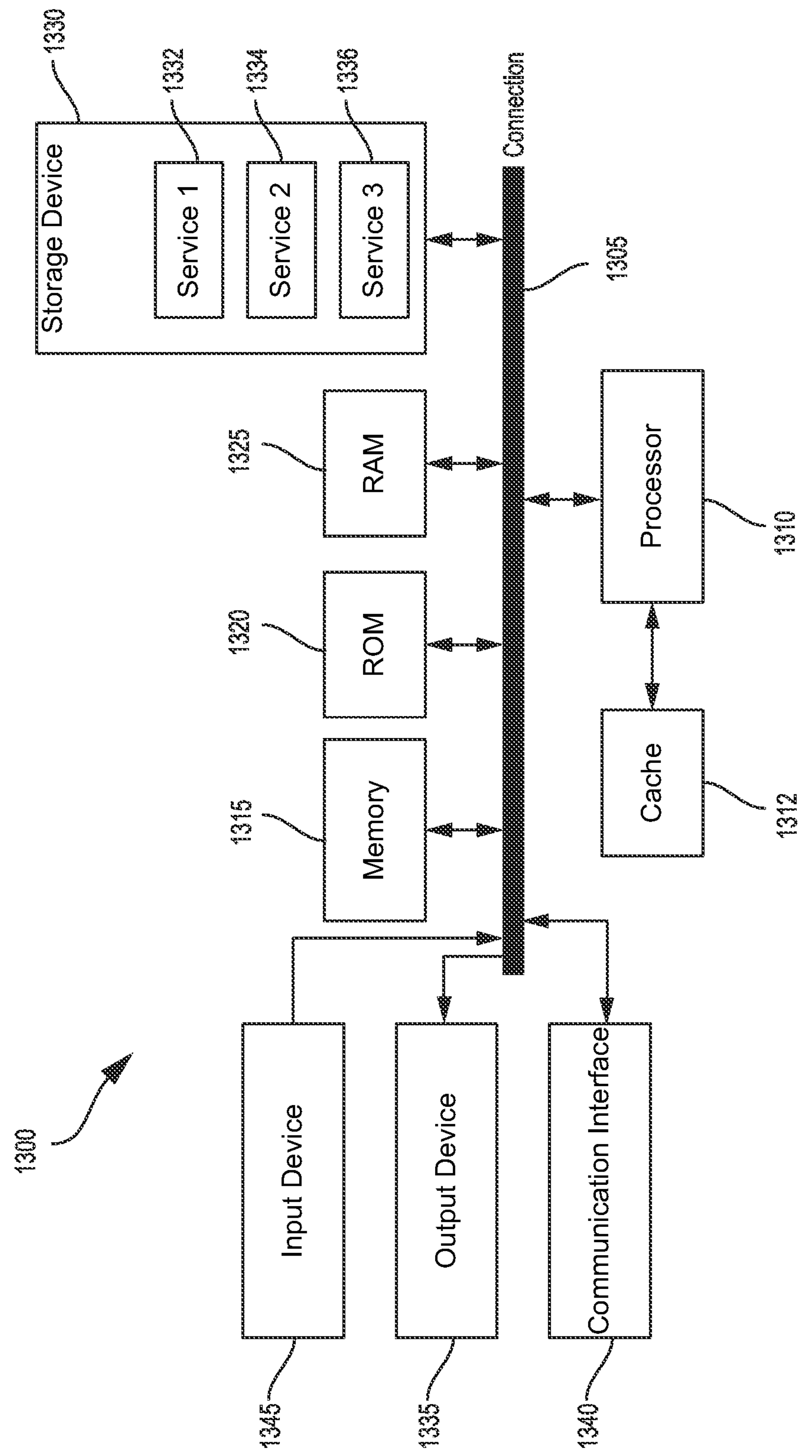
FIG. 13 is a block diagram illustrating an example of a computing system, in accordance with some examples.

FIG. 13 is a diagram illustrating an example of a system for implementing certain aspects of the present technology. In particular, FIG. 13 illustrates an example of computing system 1300, which may be for example any computing device making up internal computing system, a remote computing system, a camera, or any component thereof in which the components of the system are in communication with each other using connection 1305. Connection 1305 may be a physical connection using a bus, or a direct connection into processor 1310, such as in a chipset architecture. Connection 1305 may also be a virtual connection, networked connection, or logical connection.

In some embodiments, computing system 1300 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 may include a cache 1312 of high-speed memory connected directly with, in close proximity to, or integrated as part of processor 1310.

Processor 1310 may include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms. In some instances, multimodal systems may enable a user to provide multiple types of input/output to communicate with computing system 1300.

Computing system 1300 may include communications interface 1340, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 may include software services, servers, services, etc., that when the code that defines such software is executed by the processor 1310, it causes the system to perform a function. In some embodiments, a hardware service that performs a particular function may include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1: A wireless communication apparatus, comprising: a plurality of cylindrical lenses, each respective cylindrical lens of the plurality of cylindrical lenses having a respective first surface and a respective second surface opposite to the respective first surface, wherein each respective cylindrical lens includes a power direction corresponding to a curvature of each respective first surface and a non-power direction that is orthogonal to the power direction; and at least one linear antenna array disposed proximate to each respective second surface of each respective cylindrical lens, the at least one linear antenna array including a plurality of antenna array elements.

Aspect 2: The wireless communication apparatus of Aspect 1, wherein the first surface corresponds to a convex surface and the second surface corresponds to a planar surface.

Aspect 3: The wireless communication apparatus of any of Aspects 1 to 2, wherein the plurality of cylindrical lenses includes a skewed cylindrical lens and a differently skewed cylindrical lens.

Aspect 4: The wireless communication apparatus of Aspect 3, wherein an optical axis of the skewed cylindrical lens is offset by a first offset from a center of the skewed cylindrical lens along the power direction.

Aspect 5: The wireless communication apparatus of Aspect 4, wherein an optical axis of the differently skewed lens is offset by a second offset from a center of the differently skewed cylindrical lens along the power direction, wherein the second offset is different than the first offset.

Aspect 6: The wireless communication apparatus of any of Aspects 3 to 5, wherein: the differently skewed cylindrical lens is a non-skewed cylindrical lens; and an optical axis of the non-skewed cylindrical lens is aligned with a center of the non-skewed cylindrical lens along the power direction.

Aspect 7: The wireless communication apparatus of any of Aspects 3 to 6, wherein a curvature of a surface of the skewed cylindrical lens is asymmetric along the power direction.

Aspect 8: The wireless communication apparatus of any of Aspects 3 to 7, wherein a curvature of a surface of the differently skewed cylindrical lens along the power direction is different than a curvature of a surface of the skewed cylindrical lens along the power direction.

Aspect 9: The wireless communication apparatus of any of Aspects 3 to 8, wherein: the plurality of cylindrical lenses further includes a second skewed cylindrical lens, wherein a curvature of a first surface of the second skewed cylindrical lens is different than a curvature of a first surface of the skewed cylindrical lens; and the plurality of cylindrical lenses are aligned in a direction that is parallel to the non-power direction.

Aspect 10: The wireless communication apparatus of Aspect 9, wherein the differently skewed cylindrical lens is located between the skewed cylindrical lens and the second skewed cylindrical lens.

Aspect 11: The wireless communication apparatus of any of Aspects 3 to 10, wherein: a first linear antenna array of the at least one linear antenna array is disposed proximate to a planar surface of the skewed cylindrical lens, the first linear antenna array being associated with a first beam angle; and a second linear antenna array of the at least one linear antenna array is disposed proximate to a planar surface of the differently skewed cylindrical lens, the second linear antenna array being associated with a second beam angle different from the first beam angle.

Aspect 12: The wireless communication apparatus of Aspect 11, wherein the first beam angle is based on an offset of an optical axis of the skewed cylindrical lens from a center of the skewed cylindrical lens along the power direction.

Aspect 13: The wireless communication apparatus of any of Aspects 11 to 12, wherein the second beam angle is parallel to an optical axis of the differently skewed cylindrical lens.

Aspect 14: The wireless communication apparatus of any of Aspects 1 to 13, wherein the plurality of cylindrical lenses are aligned in a direction that is parallel to the non-power direction.

Aspect 15: The wireless communication apparatus of any of Aspects 1 to 14, wherein the plurality of antenna array elements of the at least one linear antenna array are aligned in a direction that is parallel to the non-power direction.

Aspect 16: The wireless communication apparatus of any of Aspects 1 to 15, wherein each linear antenna array disposed proximate to each respective planar surface of each respective cylindrical lens is configured to steer at least one radio frequency (RF) beam along the non-power direction of each respective cylindrical lens.

Aspect 17: The wireless communication apparatus of any of Aspects 1 to 16, wherein a distance between each antenna array element of the plurality of antenna array elements is based on a wavelength of a radio frequency (RF) signal.

Aspect 18: The wireless communication apparatus of any of Aspects 1 to 17, wherein a width dimension associated with the curvature of the respective first surface of each respective cylindrical lens is less than or equal to a thickness of the wireless communication apparatus.

Aspect 19: The wireless communication apparatus of Aspect 18, wherein a sum of the width dimension associated with the curvature of the respective first surface of each respective cylindrical lens is less than or equal to a thickness of the wireless communication apparatus.

Aspect 20: The wireless communication apparatus of any of Aspects 1 to 19, wherein the at least one linear antenna array is configured to operate in a sub-terahertz frequency range.

Aspect 21: The wireless communication apparatus of any of Aspects 1 to 20, wherein the wireless communication apparatus is configured as a user equipment (UE).

Aspect 22: The wireless communication apparatus of any of Aspects 1 to 21, further comprising: control circuitry coupled to each linear antenna array of the at least one linear antenna array, wherein each linear antenna array of the at least one linear antenna array is coupled to the control circuitry via a separate array connection, and wherein each linear antenna array of the at least one linear antenna array is controllable independent of other linear antenna arrays.

Aspect 23: The wireless communication apparatus of any of Aspects 1 to 22, wherein the at least one linear antenna array is disposed proximate to a focal distance associated with each respective cylindrical lens.

Aspect 24: A method of wireless communications, comprising: steering a first radio frequency (RF) beam in a first direction using a first linear antenna array from a plurality of linear antenna arrays, wherein the first linear antenna array is disposed proximate to a first surface of a first cylindrical lens having a curved second surface opposite to the first surface of the first cylindrical lens, and wherein the plurality of linear antenna arrays is arranged in a parallel configuration; and steering a second RF beam in a second direction using a second linear antenna array from the plurality of linear antenna arrays, wherein the second linear antenna array is disposed proximate to a first surface of a second cylindrical lens having a curved second surface opposite to the first surface of the second cylindrical lens.

Aspect 25: The method of Aspect 24, wherein the first direction is different than the second direction.

Aspect 26: The method of any of Aspects 24 to 25, wherein the first cylindrical lens is a skewed cylindrical lens and the second cylindrical lens is a differently skewed cylindrical lens.

Aspect 27: The method of any of Aspects 25 to 26, wherein: steering the first RF beam in the first direction is based on a first optical axis offset associated with the skewed cylindrical lens; and steering the second RF beam in a second direction is based on a second optical axis offset associated with the differently skewed cylindrical lens.

Aspect 28: The method of Aspect 27, wherein the first optical axis offset is different than the second optical axis offset.

Aspect 29: The method of any of Aspects 26 to 28, wherein: steering the first RF beam in the first direction using the first linear antenna array is based on a first beam angle associated with the first linear antenna array and the skewed cylindrical lens; and steering the second RF beam in the second direction using the second linear antenna array is based on a second beam angle associated with the second linear antenna array and the differently skewed cylindrical lens.

Aspect 30: The method of Aspect 29, wherein the second beam angle is different than the first beam angle.

Aspect 31: An apparatus for wireless communications, comprising: at least one memory; and at least one processor coupled to the at least one memory, wherein the at least one processor is configured to perform operations in accordance with any one of Aspects 24 to 30.

Aspect 32: An apparatus for wireless communications, comprising means for performing operations in accordance with any one of Aspects 24 to 30

Aspect 33: A non-transitory computer-readable medium comprising instructions that, when executed by an apparatus, cause the apparatus to perform operations in accordance with any one of Aspects 24 to 30.

What is claimed is:

1. A wireless communication apparatus, comprising:

a plurality of cylindrical lenses, each respective cylindrical lens of the plurality of cylindrical lenses having a respective first surface and a respective second surface opposite to the respective first surface, wherein each respective cylindrical lens includes a power direction corresponding to a curvature of each respective first surface and a non-power direction that is orthogonal to the power direction; and a plurality of linear antenna arrays arranged in a parallel configuration along the power direction, wherein each linear antenna array of the plurality of linear antenna arrays is coplanar and disposed proximate to the respective second surface of a corresponding cylindrical lens of the plurality of cylindrical lenses and including a respective plurality of antenna array elements aligned in the non-power direction along a central axis of the corresponding cylindrical lens, wherein each linear antenna array is associated with a corresponding beam angle based on an offset between the central axis and an optical axis of the corresponding cylindrical lens.

2. The wireless communication apparatus of claim 1, wherein the first surface corresponds to a convex surface and the second surface corresponds to a planar surface.

3. The wireless communication apparatus of claim 1, wherein the plurality of cylindrical lenses includes a first cylindrical lens and a second cylindrical lens, wherein the first cylindrical lens is a skewed cylindrical lens and the second cylindrical lens is a differently skewed cylindrical lens having a different skew than the first cylindrical lens.

4. The wireless communication apparatus of claim 3, wherein an optical axis of the skewed cylindrical lens is offset by a first offset from a center of the skewed cylindrical lens along the power direction.

5. The wireless communication apparatus of claim 4, wherein an optical axis of the differently skewed cylindrical lens is offset by a second offset from a center of the differently skewed cylindrical lens along the power direction, wherein the second offset is different than the first offset.

6. The wireless communication apparatus of claim 3, wherein:

the differently skewed cylindrical lens is a non-skewed cylindrical lens; and an optical axis of the non-skewed cylindrical lens is aligned with a center of the non-skewed cylindrical lens along the power direction.

7. The wireless communication apparatus of claim 3, wherein a curvature of a surface of the skewed cylindrical lens is asymmetric along the power direction.

8. The wireless communication apparatus of claim 3, wherein a curvature of a surface of the differently skewed cylindrical lens along the power direction is different than a curvature of a surface of the skewed cylindrical lens along the power direction.

9. The wireless communication apparatus of claim 3, wherein:

the plurality of cylindrical lenses further includes a second skewed cylindrical lens, wherein a curvature of a first surface of the second skewed cylindrical lens is different than a curvature of a first surface of the skewed cylindrical lens; and the plurality of cylindrical lenses are aligned in a direction that is parallel to the non-power direction.

10. The wireless communication apparatus of claim 9, wherein the differently skewed cylindrical lens is located between the skewed cylindrical lens and the second skewed cylindrical lens.

11. The wireless communication apparatus of claim 3, wherein:

a first linear antenna array of the plurality of linear antenna arrays is disposed proximate to a planar surface of the skewed cylindrical lens, the first linear antenna array being associated with a first beam angle; and a second linear antenna array of the plurality of linear antenna arrays is disposed proximate to a planar surface of the differently skewed cylindrical lens, the second linear antenna array being associated with a second beam angle different from the first beam angle.

12. The wireless communication apparatus of claim 11, wherein the first beam angle is based on an offset of an optical axis of the skewed cylindrical lens from a center of the skewed cylindrical lens along the power direction.

13. The wireless communication apparatus of claim 11, wherein the second beam angle is parallel to an optical axis of the differently skewed cylindrical lens.

14. The wireless communication apparatus of claim 1, wherein the plurality of cylindrical lenses are aligned in a direction that is parallel to the non-power direction.

15. The wireless communication apparatus of claim 1, wherein the respective plurality of antenna array elements of each linear antenna array of the plurality of linear antenna arrays are aligned in a direction that is parallel to the non-power direction.

16. The wireless communication apparatus of claim 1, wherein each linear antenna array of the plurality of linear antenna arrays is configured to steer at least one radio frequency (RF) beam along the non-power direction of the corresponding cylindrical lens.

17. The wireless communication apparatus of claim 1, wherein a distance between each antenna array element of the respective plurality of antenna array elements is based on a wavelength of a radio frequency (RF) signal.

18. The wireless communication apparatus of claim 1, wherein a width dimension associated with the curvature of the respective first surface of each respective cylindrical lens is less than or equal to a thickness of the wireless communication apparatus.

19. The wireless communication apparatus of claim 18, wherein a sum of the width dimension associated with the curvature of the respective first surface of each respective cylindrical lens is less than or equal to a thickness of the wireless communication apparatus.

20. The wireless communication apparatus of claim 1, wherein the at least one linear antenna array of the plurality of linear antenna arrays is configured to operate in a sub-terahertz frequency range.

21. The wireless communication apparatus of claim 1, wherein the wireless communication apparatus is configured as a user equipment (UE).

22. The wireless communication apparatus of claim 1, further comprising:

control circuitry coupled to each linear antenna array of the plurality of linear antenna arrays, wherein each linear antenna array of the plurality of linear antenna arrays is coupled to the control circuitry via a separate array connection, and wherein each linear antenna array of the plurality of linear antenna arrays is controllable independent of other linear antenna arrays of the plurality of linear antenna arrays.

23. The wireless communication apparatus of claim 1, wherein each linear antenna array of the plurality of linear antenna arrays is disposed proximate to a focal distance associated with the corresponding cylindrical lens.

24. A method of wireless communications, comprising:

steering a first radio frequency (RF) beam in a first direction using a first linear antenna array from a plurality of linear antenna arrays, wherein the first linear antenna array is disposed proximate to a first surface of a first cylindrical lens having a curved second surface opposite to the first surface of the first cylindrical lens, and wherein the plurality of linear antenna arrays is arranged in a parallel configuration wherein each linear antenna array of the plurality of linear antenna arrays is coplanar, and wherein each linear antenna array of the plurality of linear antenna arrays is associated with a corresponding beam angle based on an offset between a central axis and an optical axis of the corresponding cylindrical lens; and steering a second RF beam in a second direction using a second linear antenna array from the plurality of linear antenna arrays, wherein the second linear antenna array is disposed proximate to a first surface of a second cylindrical lens having a curved second surface opposite to the first surface of the second cylindrical lens.

25. The method of claim 24, wherein the first direction is different than the second direction.

26. The method of claim 24, wherein the first cylindrical lens is a skewed cylindrical lens and the second cylindrical lens is a differently skewed cylindrical lens having a different skew than the first cylindrical lens.

27. The method of claim 26, wherein:

steering the first RF beam in the first direction is based on a first optical axis offset associated with the skewed cylindrical lens; and steering the second RF beam in a second direction is based on a second optical axis offset associated with the differently skewed cylindrical lens.

28. The method of claim 27, wherein the first optical axis offset is different than the second optical axis offset.

29. The method of claim 26, wherein:

steering the first RF beam in the first direction using the first linear antenna array is based on a first beam angle associated with the first linear antenna array and the skewed cylindrical lens; and steering the second RF beam in the second direction using the second linear antenna array is based on a second beam angle associated with the second linear antenna array and the differently skewed cylindrical lens.

30. The method of claim 29, wherein the second beam angle is different than the first beam angle.

* * * * *